United States Patent
Krishnan Gorumkonda

(10) Patent No.: US 12,494,221 B2
(45) Date of Patent: *Dec. 9, 2025

(54) NEURAL NETWORKS FOR CHANGING CHARACTERISTICS OF VOCALS

(71) Applicant: Snap Inc., Santa Monica, CA (US)

(72) Inventor: Gurunandan Krishnan Gorumkonda, Kirkland, WA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/440,082

(22) Filed: Feb. 13, 2024

(65) Prior Publication Data
US 2024/0185879 A1     Jun. 6, 2024

Related U.S. Application Data

(63) Continuation of application No. 17/218,684, filed on Mar. 31, 2021, now Pat. No. 11,935,556.

(51) Int. Cl.
*G10L 25/51* (2013.01)
*G10L 15/16* (2006.01)
*G10L 15/26* (2006.01)

(52) U.S. Cl.
CPC .............. *G10L 25/51* (2013.01); *G10L 15/16* (2013.01); *G10L 15/26* (2013.01)

(58) Field of Classification Search
CPC ......... G10L 25/51; G10L 15/16; G10L 15/26; G10L 2021/0135; G10L 21/007; G06N 3/0454; G06N 3/088
See application file for complete search history.

(56) References Cited

U.S. PATENT DOCUMENTS

2021/0074305 A1 * 3/2021 Gopala .................. G10L 25/30
2022/0134435 A1   5/2022 Scime et al.
(Continued)

FOREIGN PATENT DOCUMENTS

CN         117099158 A     11/2023
WO    WO-2022213031 A1   10/2022

OTHER PUBLICATIONS

Kaneko, Takuhiro, et al. "Cyclegan-vc2: Improved cyclegan-based non-parallel voice conversion." ICASSP 2019-2019 IEEE International Conference on Acoustics, Speech and Signal Processing (ICASSP). IEEE, 2019. (Year: 2019) (Year: 2019).*

(Continued)

*Primary Examiner* — Athar N Pasha
(74) *Attorney, Agent, or Firm* — Schwegman Lundberg & Woessner, P.A.

(57) ABSTRACT

A messaging system for audio character type swapping. Methods of audio character type swapping include receiving input audio data having a first characteristic and transforming the input audio data to an input image where the input image represents the frequencies and intensities of the audio. The methods further include processing the input image using a convolutional neural network (CNN) to generate an output image and transforming the output image to output audio data, the output audio data having a second characteristic. The input audio and output audio may include vocals. The first characteristics may indicate a male voice and the second characteristics may indicate a female voice. The CNN is trained together with another CNN that changes input audio having the second characteristic to audio having the first characteristic. The CNNs are trained using discriminator CNNs that determine whether audio has a first characteristic or a second characteristic.

20 Claims, 16 Drawing Sheets

(56) References Cited

U.S. PATENT DOCUMENTS

| | | |
|---|---|---|
| 2022/0238128 A1 | 7/2022 | Chi et al. |
| 2022/0309336 A1 | 9/2022 | Minkin |
| 2022/0319534 A1 | 10/2022 | Krishnan Gorumkonda |

OTHER PUBLICATIONS

Abdulatif, Sherif, et al. "Aegan: Time-frequency speech denoising via generative adversarial networks." 2020 28th European Signal Processing Conference (EUSIPCO). IEEE, 2021 (Year: 2021) (Year: 2021).*

Armanious K, Jiang C, Fischer M, Küstner T, Hepp T, Nikolaou K, Gatidis S, Yang B. MedGAN: Medical image translation using GANs. Computerized medical imaging and graphics. Jan. 1, 2020;79:101684. (Year: 2020).*

"U.S. Appl. No. 17/218,684, Corrected Notice of Allowability mailed Nov. 15, 2023", 2 pgs.

"U.S. Appl. No. 17/218,684, Final Office Action mailed Aug. 15, 2023", 17 pgs.

"U.S. Appl. No. 17/218,684, Non Final Office Action mailed Dec. 30, 2022", 18 pgs.

"U.S. Appl. No. 17/218,684, Notice of Allowance mailed Nov. 1, 2023", 7 pgs.

"U.S. Appl. No. 17/218,684, Response filed May 1, 2023 to Non Final Office Action mailed Dec. 30, 2022", 9 pgs.

"U.S. Appl. No. 17/218,684, Response filed Oct. 16, 2023 to Final Office Action mailed Aug. 15, 2023", 9 pgs.

"International Application Serial No. PCT/US2022/071311, International Preliminary Report on Patentability mailed Oct. 12, 2023", 9 pgs.

"International Application Serial No. PCT/US2022/071311, International Search Report mailed Jul. 13, 2022", 4 pgs.

"International Application Serial No. PCT/US2022/071311, Written Opinion mailed Jul. 13, 2022", 8 pgs.

Falk, Thorsten, et al., "U-Net—Deep Learning for Cell Counting, Detection, and Morphometry", author preprint, Nature Methods 16, 67-70, (2019), 14 pgs.

Johnson, Justin, et al., "Perceptual Losses for Real-Time Style Transfer and Super-Resolution", arXiv preprint, arXiv:1603.08155v1, (Mar. 27, 2016), 18 pgs.

Kingma, Diederik P, et al., "Adam: A Method for Stochastic Optimization", (Jan. 30, 2017), 15 pgs.

Long, Jonathan, et al., "Fully Convolutional Networks for Semantic Segmentation", IEEE Conference on Computer Vision and Pattern Recognition (CVPR), Boston, MA, [Online] Retrieved from the internet: <https://openaccess.thecvf.com/content_cvpr_2015/papers/Long_Fully_Convolutional_Networks_2015_CVPR_paper.pdf>, (Jun. 2015), 10 pgs.

Sherif, Abdulatif, et al., "AeGAN: Time-Frequency Speech Denoisinq via Generative Adversarial Networks", 5 pgs.

Takuhiro, Kaneko, et al., "CycleGAN-VC2: Improved Cycl.eGAN-based Non-paral.l.el. Voice Conversion", arxiv.org, Cornell University Library, 201 Olin Library Cornell University Ithaca, NY 14853, (Apr. 9, 2019), 5 pgs.

"European Application Serial No. 22720893.1, Communication Pursuant to Article 94(3) EPC mailed Oct. 8, 2024", 7 pgs.

"Korean Application Serial No. 10-2023-7037083, Notice of Preliminary Rejection mailed Nov. 19, 2024", W/English Translation, 11 pgs.

Kaneko, Takuhiro, et al., "CycleGAN-VC2: Improved CycleGAN-based Non-parallel Voice Conversion", arxiv.org, Cornell University Library, 201 Olin Library Cornell University Ithaca, NY 14853, (Apr. 9, 2019), 5 pgs.

Sherif, Abdulatif, et al., "AeGAN: Time-Frequency Speech Denoising via Generative Adversarial Networks", 28th European Signal Processing Conference (EUSIPCO), (Jan. 2021), 5 pgs.

* cited by examiner

NEURAL NETWORKS FOR CHANGING CHARACTERISTICS OF VOCALS

PRIORITY CLAIM

This application is a continuation of U.S. patent application Ser. No. 17/218,684, filed on Mar. 31, 2021, which is hereby incorporated by reference in its entirety.

TECHNICAL FIELD

Examples of the present disclosure generally relate to a messaging application processing vocals having a first characteristic to generate vocals having a second characteristic. More particularly, but not by way of limitation, examples of the present disclosure relate to a messaging application using neural networks to change a characteristic, such as a gender, of vocals, and in some examples, transforming the vocals into an image representing frequencies and intensities of the vocals before changing the characteristic of the vocals.

BACKGROUND

The users of messaging systems often capture vocals, which includes any vocalization. The users often want to modify and share the modified vocals. But many conventional methods of modifying vocals require a great deal of computation that may be beyond what can be provided by a mobile device. Additionally, conventional methods often do not provide the flexibility to create a variety of different modifications to the vocals from which the users may select.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some examples are illustrated by way of example, and not limitation, in the figures of the accompanying drawings in which.

DETAILED DESCRIPTION

Figure 1:
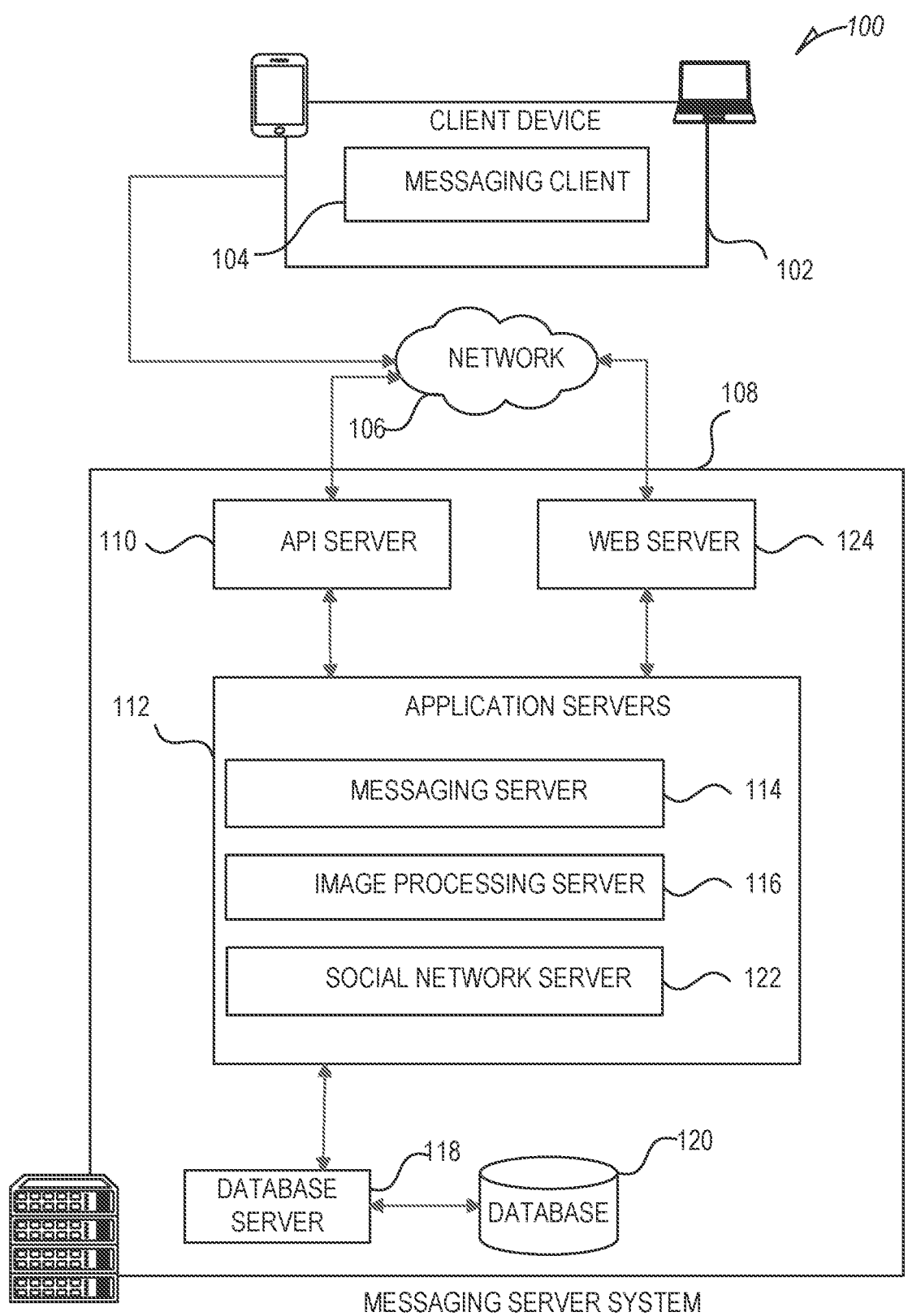
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

Users of a messaging system would like to be able to change characteristics of vocals, which includes any vocalization made by an animal. For example, users of a messaging system would like to be able to switch the gender of their voice from female to male or from male to female. However, changing the characteristics of vocals may be time-consuming using conventional methods and often the results are not acceptable to the user of the messaging system. Moreover, pairs of the vocals with a before the characteristic change and after the characteristic change are not readily available in large enough numbers to use as a ground truth to train a neural network. Further, the vocals with the changed characteristics may not exist. For example, if a female user wants to change an audio recording of her speaking to give her a male voice, then there simply is no way to have an audio recording of her with a male voice because she is a female.

A technical problem is how to train a neural network for changing characteristics of vocals when a ground truth with a large number of pairs to use to train the neural network is not available. In some examples, the technical problem is solved by training a pair of neural networks together. A first neural network that changes the characteristics of the vocals from a first characteristic to a second characteristic and a second neural network that changes the characteristics of the vocals from the second characteristic to the first characteristic. The output of the first neural network is fed into the second neural network, which provides feedback to the first neural network. And, the output of the second neural network is fed into the first neural network to provide feedback to the second neural network. The feedback in both cases acts as a ground truth output where the initial input acts as the ground truth input. An input-output loss is determined based on a difference between the feedback and the input to the neural network.

Additionally, in some examples, a first discriminator neural network and a second discriminator neural network are trained to determine whether vocals have a first characteristic or a second characteristic, respectively. The output from the first neural network is feed into the first discriminator neural network and the logistical output is used as feedback to train the first neural network. Similarly, the output from the second neural network is feed into the second discriminator neural network and the logistical output is used as feedback to train the second neural network.

Additionally, in some examples, the technical problem is addressed by training the first neural network and the second neural network with a feature loss. The feature loss is determined by feeding the feedback described above into the corresponding discriminator neural network and saving the feature values as first feature values, and by feeding a ground truth input into the corresponding discriminator neural network and saving the feature values as second feature values. The feature loss can then be determined as the difference between the first feature values and the second feature values. The feature loss from the loss network can then be used to train the corresponding first or second neural network. The feature loss improves the convergence of the training to change the vocals to have the first or second characteristic. In some examples, a combination of the logistical output, the input-output loss, and the feature loss is used to train the first and second neural networks using stochastic gradient descent to minimize a weighted combination of the three values.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data).

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120 that stores data associated with messages processed by the application servers 112. Similarly, a web server 124 is coupled to the application servers 112 and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114.

Figure 3:
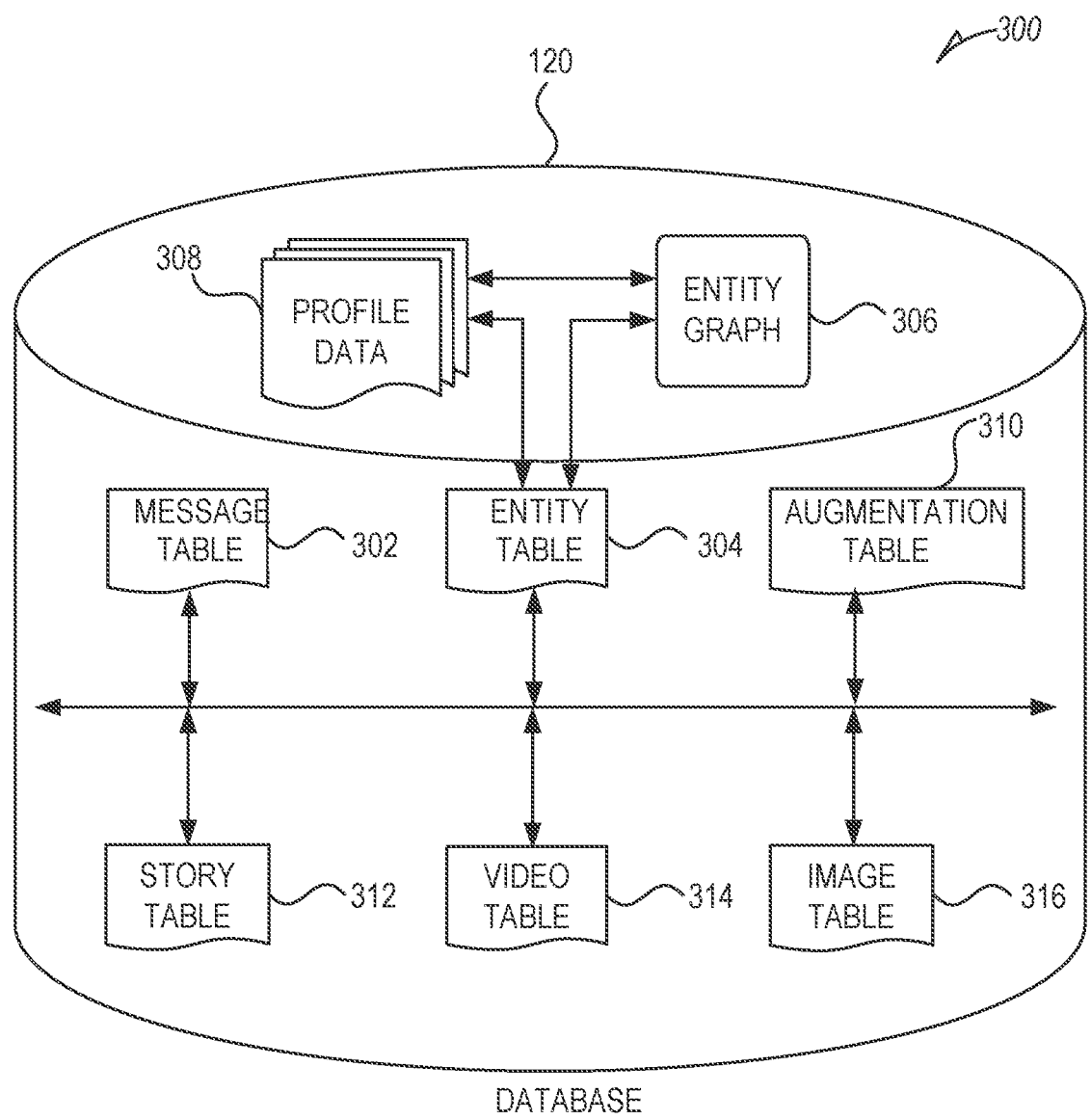
FIG. 3 is a diagrammatic representation of a data structure as maintained in a database, in accordance with some examples.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system 100 with which a particular user has relationships or is "following," and also the identification of other entities and interests of a particular user.

System Architecture

Figure 2:
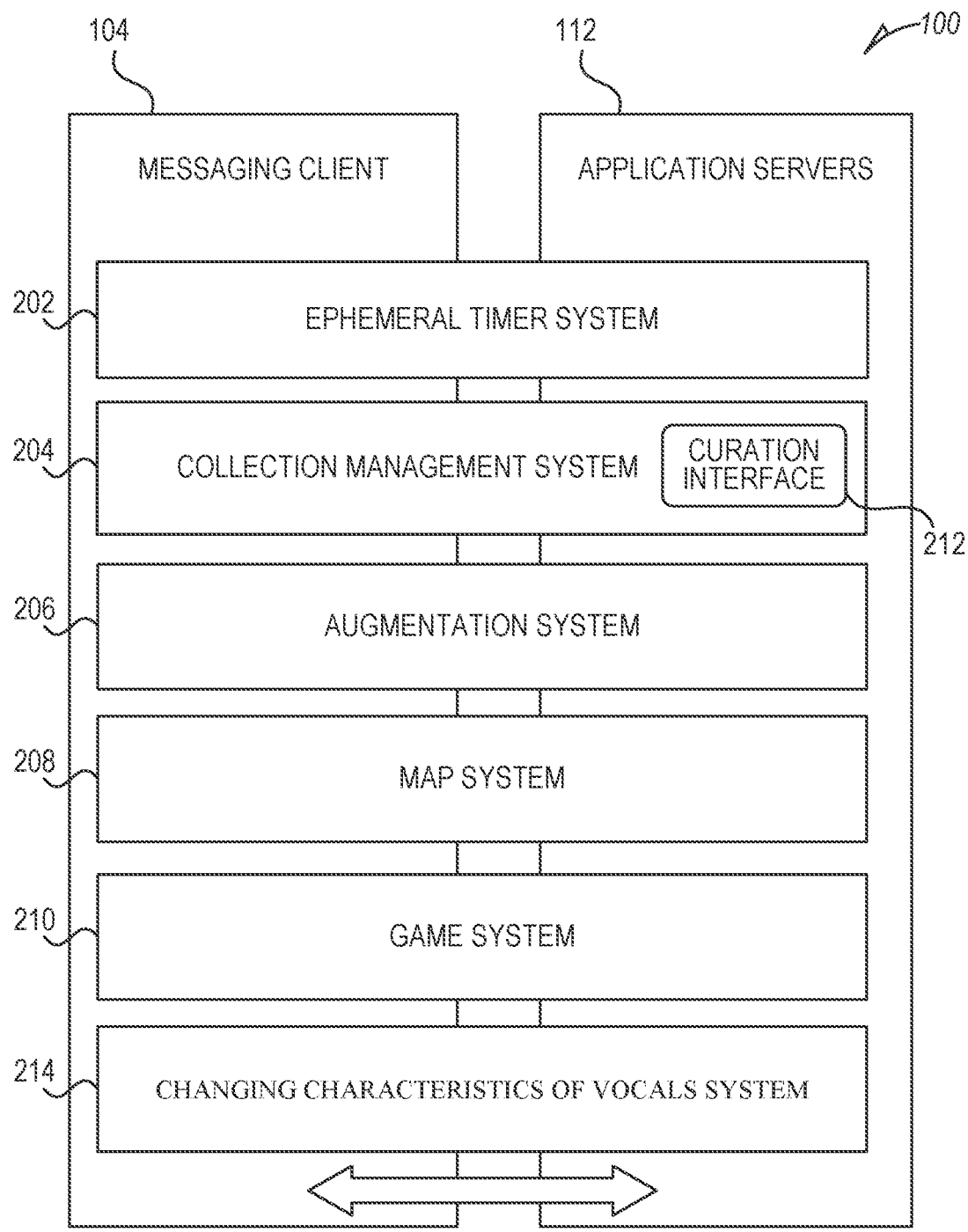
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 112. The messaging system 100 embodies a number of subsystems, which are supported on the client-side by the messaging client 104 and on the server-side by the application servers 112. These subsystems include, for example, an ephemeral timer system 202, a collection management system 204, a modification system 206, a map system 208, a game system 210, and a changing characteristics of vocals system 214.

The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 104 based on a geolocation of the client device 102. In another example, the augmentation system 206 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions and supports the presentation of map-based media content and messages by the messaging client 104. For example, the map system 208 enables the display of user icons or avatars (e.g., stored in profile data 308) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 210 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

The changing characteristics of vocals system 214 provides various functions related to processing vocals to change a first characteristic of the vocals to a second characteristic such as is performed by CNN 622. In some examples, the changing characteristics of vocals system 214 provides a means for user devices 102 to process an audio mixture 602 and change a first characteristic of audio vocals to a second characteristic. The changing characteristics of vocals system 214 provides access to a user interface 1200 for changing characteristics of vocals. The changing characteristics of vocals system 214 provides access to a database of weights 624 that may be accessed to use a CNN to change characteristics of vocals.

Data Architecture

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any particular one message, at least message sender data, message recipient (or receiver) data, and a payload. Further details regarding information that may be included in a message and included within the message data stored in the message table 302 is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 120 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects and using transformations and animated textures of the model within the video to achieve the transformation. In other examples, tracking of points on an object may be used to place an image or texture (which may be two-dimensional or three-dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other examples, other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client application operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end-user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314. The database 120 can also store the weights of neural networks such as weights 624 of FIG. 6 and weights 726 of FIG. 7. The database 120 can also store ground truth inputs 726 and ground truth inputs 902.

Data Communications Architecture

Figure 4:
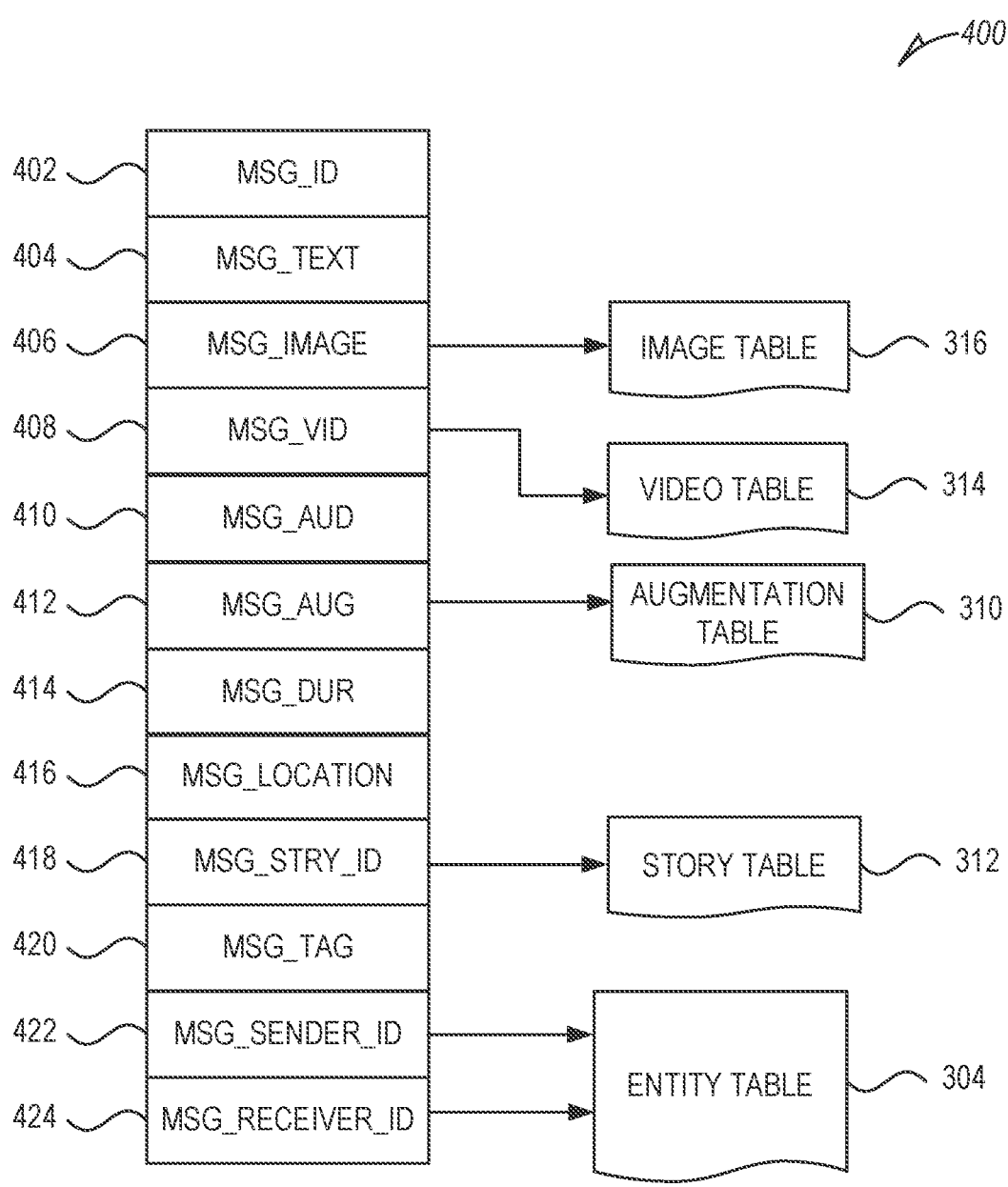
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "in-flight" data of the client device 102 or the application servers 112. A message 400 is shown to include the following example components:

Message identifier 402 (MSG_ID 402): a unique identifier that identifies the message 400. Message text payload 404 (MSG_TEXT 404): text, to be generated by a user via a user interface of the client device 102, and that is included in the message 400.

Message image payload 406 (MSG_IMAGE 406): image data, captured by a camera component of a client device 102 or retrieved from a memory component of a client device 102, and that is included in the message 400. Image data for a sent or received message 400 may be stored in the image table 316.

Message video payload 408: video data, captured by a camera component or retrieved from a memory component of the client device 102, and that is included in the message 400. Video data for a sent or received message 400 may be stored in the video table 314.

Message audio payload 410: audio data, captured by a microphone or retrieved from a memory component of the client device 102, and that is included in the message 400.

Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

Message duration parameter 414 (MSG_DUR 414): parameter value indicating, in seconds, the amount of time for which content of the message (e.g., the message image payload 406, message video payload 408, message audio payload 410) is to be presented or made accessible to a user via the messaging client 104.

Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

Message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the Client device 102 on which the message 400 was generated and from which the message 400 was sent.

Message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentations 412 may point to data stored in an augmentation table 310, values stored within the message story identifier 418 may point to data stored in a story table 312, and values stored within the message sender identifier 422 and the message receiver identifier 424 may point to user records stored within an entity table 304.

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Time-Based Access Limitation Architecture

Figure 5:
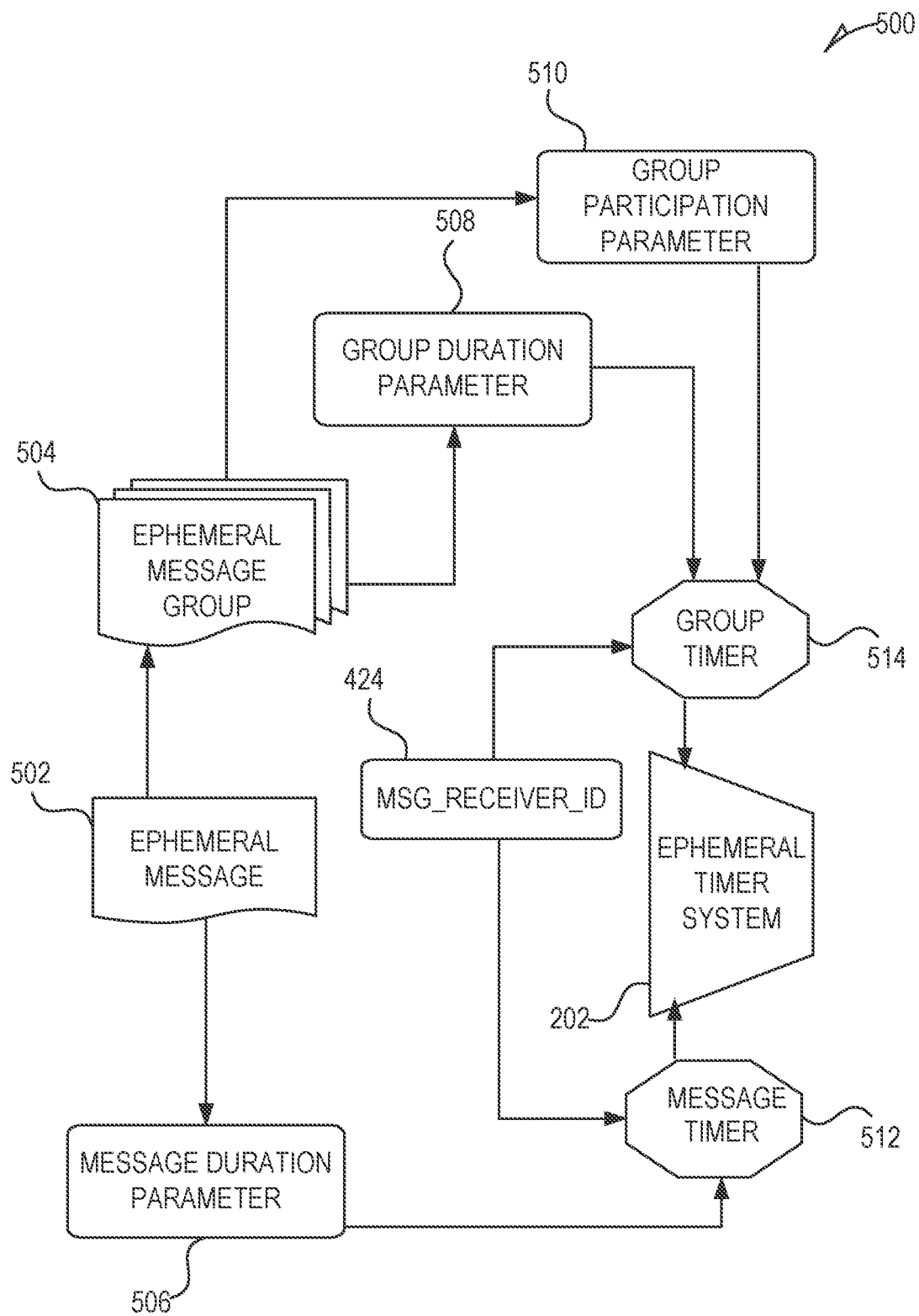
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified twenty-four hours. The ephemeral timer system 202 also operates to remove an ephemeral message group 504 when either the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Neural Networks for Changing Characteristics of Vocals

Figure 6:
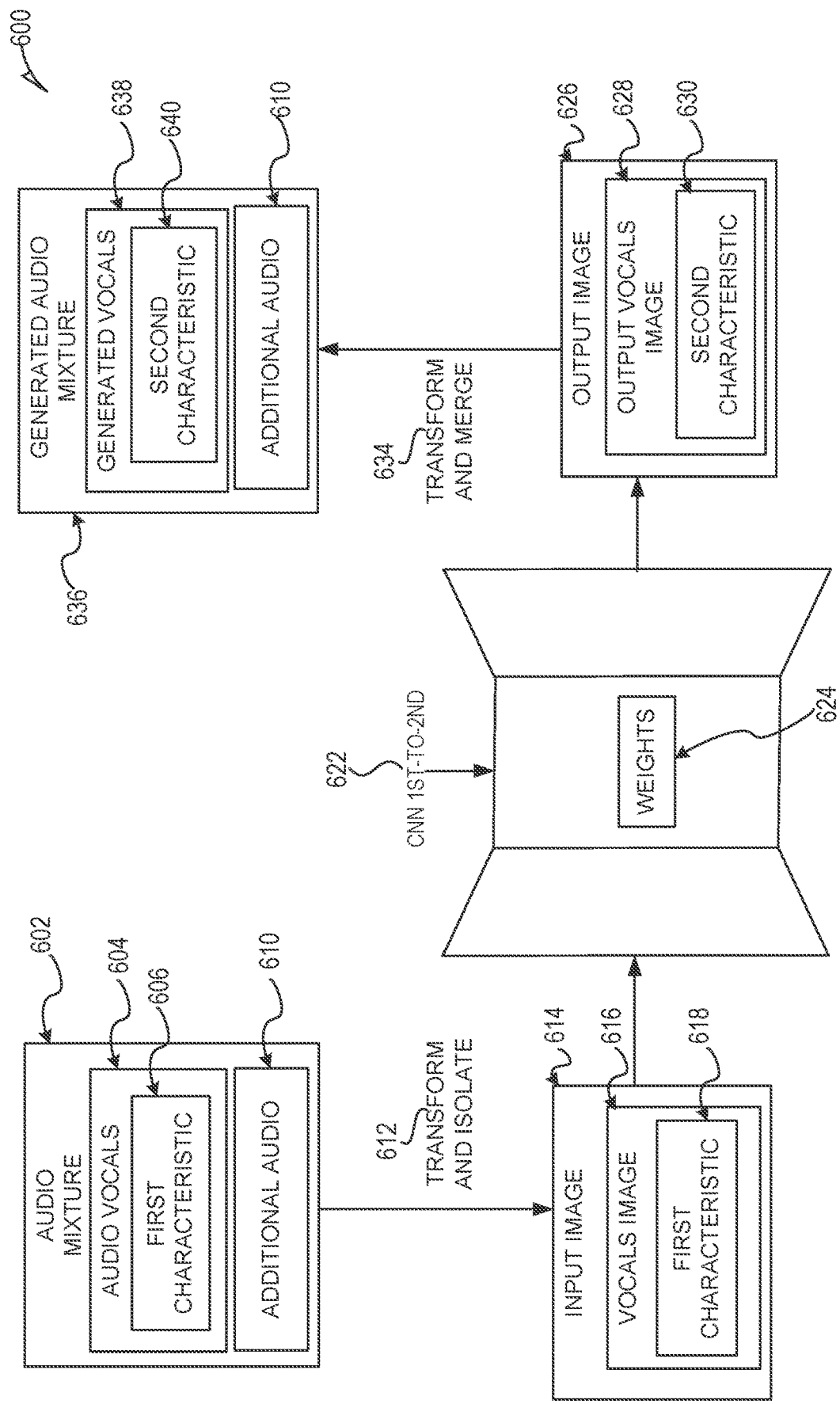
FIG. 6 illustrates a system for changing characteristics of vocals, in accordance with some examples.

FIG. 6 illustrates a system 600 for changing characteristics of vocals, in accordance with some examples. The system 600 takes as input audio mixture 602 and produces generated audio mixture 636. Audio mixture 602 includes audio vocals 604 and additional audio 610. In some examples the audio mixture 602 and generated audio mixture 636 are in a standard data format that is used for streaming songs or speech on the internet such as MP3, MP4, WAV, and so forth. Vocals refers to any vocalization by an animal such as speech, vocals of a song, and so forth. In some examples vocals are synthetic such as a cartoon voice. The audio vocals 604 is vocal data representing the audio vocals 604. The generated vocals 638 is generated vocal data representing the generated vocals.

In some examples audio vocals 604 has a first characteristic 606. Generated audio mixture 636 includes generated vocals 638. In some examples generated vocals 638 has second characteristic 640. In an example, the audio vocals 604 are a male voice saying a sentence and the generated audio vocals 638 are the same sentence with the male voice being changed to a female voice. The first characteristic 606 is a male voice or male vocalization and the second characteristic 640 is a female voice or female vocalization. The audio vocals 604 is audio vocal data representing the audio vocals, in accordance with some embodiments.

The first characteristic 606 and second characteristic 640 are frequency, intensity, and duration of the audio vocals 604, generated vocals 638, respectively. The first characteristic 606 and second characteristic 640 indicate groupings of the characteristics such as that a male voice generally has a frequency between 85 Hz and 155 Hz and a female voice generally has a frequency between 165 Hz and 255 Hz. Additionally, characteristics may include differences in the durations of vocalizations, differences in frequency patterns, differences in intensities, and so forth. In some examples different characteristics are defined based on a ground truth used to train the CNN first characteristic to second characteristic (1ST-to-2ND) 622. In some examples the second characteristic 640 is a character such as a famous person or cartoon character where the first characteristic 606 is a voice of a user. In some examples the second characteristic 640 is an effect to the audio vocals such as the effects of helium to the audio vocals or lisping. In some example the second characteristic 640 is a child's voice type. In some examples the ground truth used to train the CNN 1ST-to-2ND 622 comprises many different sentences of a normal voice of a user as the first characteristic 618 and a famous person or cartoon character as the second characteristic 630. In these examples the normal voice may still be recognizable in the generated vocals 638 but with a characteristic of the vocals changed to the second characteristic 630. As an example, the audio vocals 604 are a normal user with a first characteristic 606 and the CNN 1ST-to-2ND 622 changes their audio vocals 604 to generated vocals 638 with the second characteristic 640 where the second characteristic 640 is that the generated vocals 638 sound like a famous singer.

The additional audio 610 is any additional audio that may be part of the audio mixture 602. For example, when the audio mixture 602 is a song, the audio vocals 604 are the audio vocal portion of the song, and the additional audio 601 is the accompaniment portion of the song. The audio mixture 602 may be part of a video, in accordance with some examples.

In accordance with some examples the audio vocals 604 are converted to a time-frequency (TF) representation as disclosed herein. Different TF representations result in different input images 614. In accordance with some examples, the TF representation is a matrix that encodes a time-varying spectrum of the waveform. The TF representation includes entries called TF bins that encode the waveform for the different time frames and frequency channels, in accordance with some examples. In some examples, the TF representation is a short time Fourier transform (STFT) where the angle is for the phase and magnitude is for the amplitude of the sinusoid in the sound signal.

Transform and isolate 612 transforms the audio vocals 604 into an input image 614 and removes the additional audio 610. For example, a module such as changing characteristics of vocals system 214 takes the TF representation and creates the input image 614. The additional audio 610 may be removed by changing characteristics of vocals system 214 using another trained CNN such as one that separates audio vocals from the audio accompaniment.

In some examples, the input image 614 is represented with time along a horizontal axis and frequency along a vertical axis. The audio vocals 604 have an extra dimension of a channel dimensional when multiple channels such as for a song are used. The amplitude of the frequency at a time is represented by the intensity of each point in the image. In some examples, the input image 614 is a three-dimensional graph with axes of time, frequency, and amplitude.

The input image 614 includes vocals image 616, which has a first characteristic 618. The input image 614 is input to the CNN 1ST-to-2ND 622 with weights 624. The CNN 1ST-to-2ND 622 generates an output image 626 where the output vocals image 628 have a second characteristic 630 rather than the first characteristic 618.

In some examples the output vocals image 628 may have portions of the first characteristic 618 or may be a merger of the first characteristic 618 and the second characteristic 630. The portions of the output vocals image 628 that have the first characteristics 618 or a merged first characteristic 618 and a second characteristic 630 are considered noise.

Transform and merge 634 converts or transforms the output image 626 into the generated audio mixture 636, which may be a popular format for playing songs or recording vocals. Transform and merge 634 may transform the output vocals image 628 into the generated vocals 638 and merge the additional audio 610 with the generated vocals 638. The generated vocals 638 have second characteristic 640. In some examples the additional audio 610 is null or not present.

In some examples, the CNN 1ST-to-2ND 622 comprises convolution layers that use Rectified Linear Unit (ReLU) for an activation function with a n×n stride with n being 3 or another integer such as 2, 4, 5, and so forth. A feature layer is determined based on Equation (1). Equation (1): $b_{x,y,l}$=ReLU $(\Sigma_U w_{i,j,k,l} * a_{x+i,y+j,k} + c_l)$, where U represents for $i \in \{-1,0, 1\}$, $j \in \{-1, 0, 1\}$, and $k \in \{1, \ldots K\}$; w is the weight; a is the activation; x and y are the position in layer, l; $c_l$ is a constant for layer l; and, K is the number of feature layers of the previous layer of the CNN 1ST-to-2ND 622. The first convolution layer is the input image 614, in accordance with some examples.

In some examples, the CNN 1ST-to-2ND 622 includes maximum pooling layers where the values of the layer are determined based on Equation (2), which is for a 2×2 to 1 maximum pooling layer. Values other than 2 and 1 may be used. Equation (2): $b_{x,y,k}$=$\max_U(a_{2x+2y+j,k})$, where U represents for $i \in \{0, 1\}$ and $j\{0, 1\}$; b is the maximum pooling value; k is the channel; and, a is the activation value.

In some examples, the CNN 1ST-to-2ND 622 includes up-convolution layers where the values are determined based on Equation (3): $b_{2x+i,2y+j,l}$=ReLU $(\Sigma_U w_{i,j,k,l} * a_{x,y,k} + c_l)$, where U represents for $i \in \{0, 1\}$, $j \in \{0, 1\}$, and $k \in \{1, \ldots K\}$; w is the weight; a is the activation; x and y are the position in layer, l; $c_l$ is a constant for layer l; and, K is the number of feature layers of the previous layer of the CNN 1ST-to-2ND 622. Equation (3) is for an up-conversion of 1 to 2×2 other values for the up-conversion may be used. The last layer of the CNN 1ST-to-2ND 622 includes a segmentation map that indicates which portions of the output image 626 are part of the output audio vocals image 628, in accordance with some examples. In some examples for CNN 1ST-to-2ND 622 the last layer is output image 626 with the transformed first characteristic 618 transformed to the second characteristic 630. The training of the CNN 1ST-to-2ND 622 is disclosed in conjunction with FIG. 9.

Figure 7:
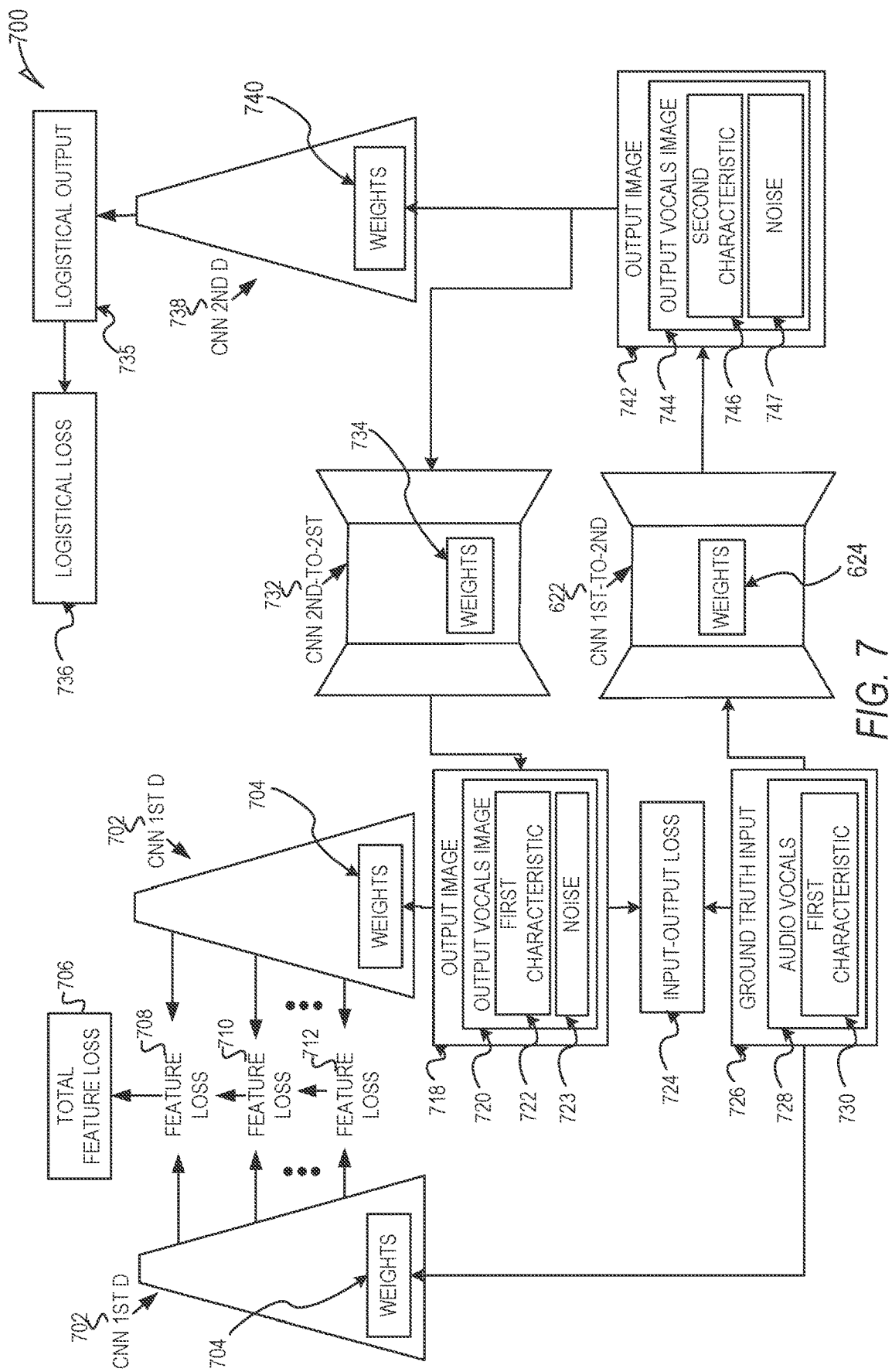
FIG. 7 illustrates determining losses for training the convolution neural networks (CNN), in accordance with some examples.

FIG. 7 illustrates determining losses for training the convolution neural networks (CNNs), in accordance with some examples. FIG. 7 illustrates determining the losses for CNN 1ST-to-2ND 622 where determining the losses for CNN 2ND-to-1ST 732 is similar.

Figure 9:
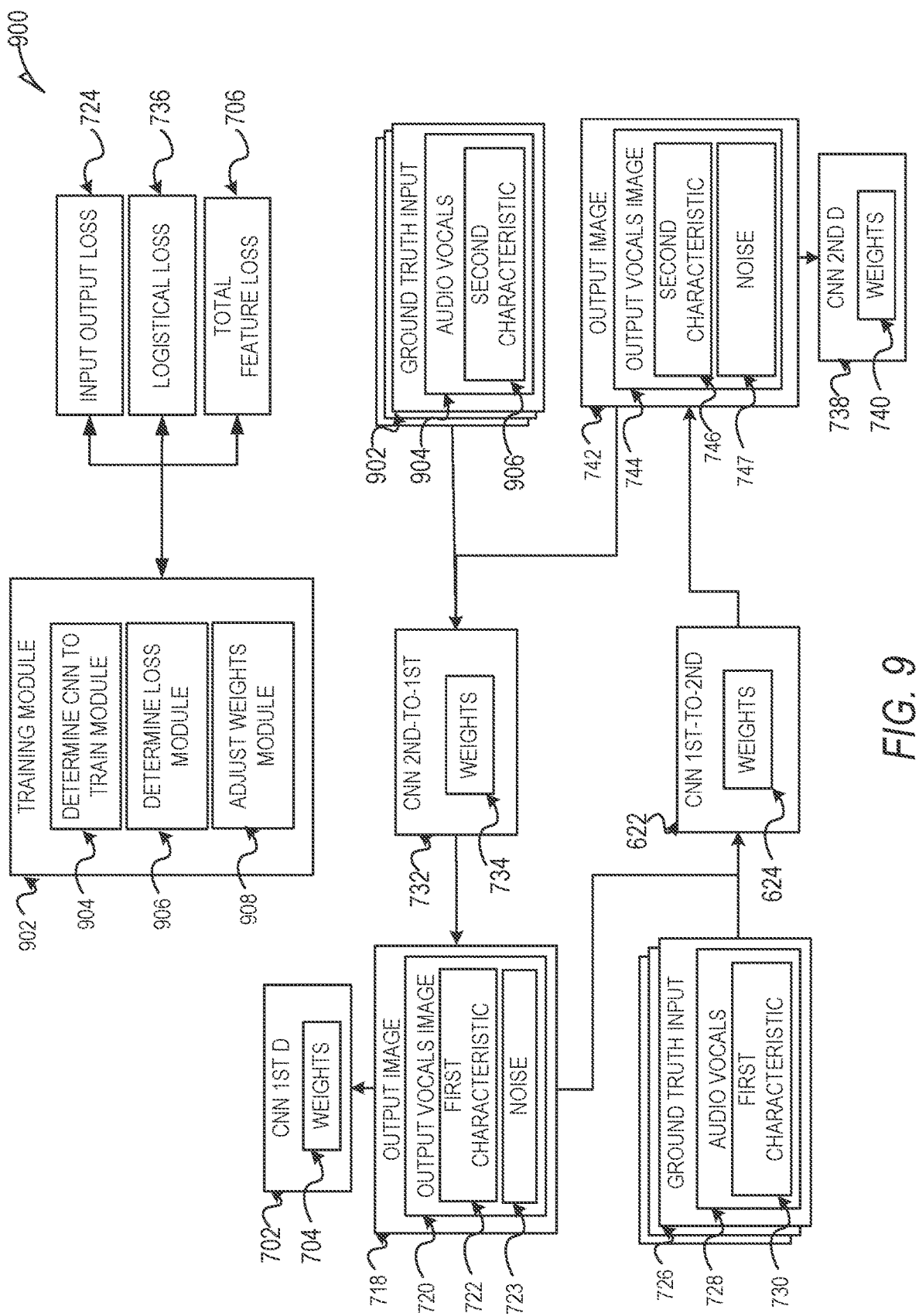
FIG. 9 illustrates the training of CNN 1ST-to-2ND and CNN 2ND-to-1ST, in accordance with some examples.

The total feature loss 726, logistical loss 736, and input-output loss 724 are used for training the CNN 1ST-to-2ND 622 and the CNN 2ND-to-1ST 732 as described in conjunction with FIG. 9. The CNN 2ND-to-1ST 732 has a similar or same structure as the CNN 1ST-to-2ND 622.

A ground truth input 726 that includes audio vocals 728 having a first characteristic 730 is the input to the CNN 1ST-to-2ND 622. The ground truth input 726 is an image or is converted to an image as described in conjunction with FIG. 6 and herein. The CNN 1ST-to-2ND 622 processes the ground trught input 726 to determine or generate output image 742 based on the weights 624 and the structure of the CNN 1ST-to-2ND 622. The output vocals image 744 has a second characteristic 746 and noise 747. The noise 747 is portions of the output vocals image 744 that do not have the second characteristic 746, in accordance with some examples. In some examples the noise 747 is portions of the output vocals image 744 that have the first characteristic 730 or have a characteristic that is a merger of the first characteristic 730 and the second characteristic 746. The output vocals image 744 may not include all of the audio vocals 728, in accordance with some examples.

The CNN 2ND discriminator (D) 738 is a CNN with weights 740 that is trained to determine whether the output image 742 is of type second characteristic 746. The logistical output 735 indicates either a yes or no, in accordance with some examples. The logistical loss 736 is then determined based on the logistical output 735. For example, a zero value may be used for logistical loss 736 if the logistical output 735 indicates the output vocals image 744 is of type second characteristic 746 and a value of one or another value is used if the logistical output 735 indicates the output vocals image 744 is not of type second characteristic 746. The training of the CNN 2ND D 738 and the CNN 1ST D 702 is described in conjunction with FIG. 11. The output vocals image 744 is fed into the CNN 2ND D 738 as input and the CNN 2ND D 738 determines the logistical output 735. The logistical output 735 is an indication of whether the output vocals image 744 has the second characteristics 746 or not. For example, the CNN 2ND D 738 is trained to determine whether or not output vocals image 744 is a female voice or not. The logistical loss 736 is used for training the CNN 1ST-to-2ND 622 as described in conjunction with FIG. 9.

In some examples, a total feature loss 706 is determined for training the CNN 1ST-to-2ND 622. The total feature loss 706 is determined based on feature loss 708, 710, and 712 and Equations (4) and (5).

$$l_{feat}^j(\tilde{x}_a, x_a) = \frac{1}{C_j H_j W_j} \|v_j(\tilde{x}_a) - v_j(x_a)\|_2^2, \quad \text{Equation (4)}$$

where $v_j(x)$ is the activations of the jth convolution layer of the CNN 1ST D 702; feat stands for the feature loss; $C_j$ is the number of channels of features for the jth layer; $H_j$ is the height of the jth layer; and, $W_j$ is the width of the jth layer. In some examples, only some of the convolution layers, j, are used. For example, only the first m convolutional layers, every x convolutional layers, the first y convolutional layers, or the last z convolutional layers are used. CNN 1ST D 702 is trained to determine a logistical output that indicates whether the input is vocals of the first characteristic. The training of CNN 1ST D 702 is discussed in conjunction with FIG. 11.

Equation (5): $L = \Sigma_{j=1}^n l_{feat}^j(\tilde{x}_a, x_a)$, where L is the total feature loss 706 and n is the number of convolution layers. To determine total feature loss 706 the audio vocals 728, which may be converted to an image, are input to CNN 1ST-to-2ND 622, which generates the output image 742. The output image 742 is fed into CNN 2ND-to-1ST 732, which determines the output image 718 based on the weights 734 and the structure of the CNN 2ND-to-1ST 732. The output vocals image 720 has a first characteristic 722 and noise 723. The noise 723 is portions of the output vocals image 720 that do not have the first characteristic 722, in accordance with some examples.

The output vocals image 720 is input to CNN 1ST D 702 and audio vocals 728 of ground truth input 726, which are converted to an image, is also fed into CNN 1ST D 702. Equations (4) and (5) are then applied to the feature loss 708, 710, 712 at one or more convolutional layers of CNN 1ST D 702 to determine the total feature loss 706. In some examples, the feature loss 708, 710, 712 is determined for fewer than each of the convolutional layers of the loss network 728.

The input-output loss 724 is a difference between the audio vocals 728, which may be converted to an image, and output vocals image 720. In some examples input-output loss 724 is determined based on a mean square error between the audio vocals 728 converted to an image and the output vocals image 720. In some examples Equation (6) is used to determine the input-output loss 724. Equation (6): $L = \|\tilde{X}_a - X_a\|_i = \|G(F(X, \Theta 1), \Theta 2) - X_a\|_i$, where L is the input-output loss 724; $X_a$ is the audio vocals 728 of ground truth input 726; $\tilde{X}_a$ is the audio vocals of output vocals image 720; $F(X, \Theta)$ is ground truth input 726 (X) as input to CNN 1ST-to-2ND 622 ($\Theta 1$); and, $G(F(X, \Theta 1), \Theta 2)$ is the result of $F(X, \Theta 1)$ as input to CNN 2ND-to-1ST 732. In some examples a goal of training the CNN 1ST-to-2ND 622 and CNN 2ND-to-1ST 732 is to reduce the input output loss 724 to below a threshold.

Figure 8:
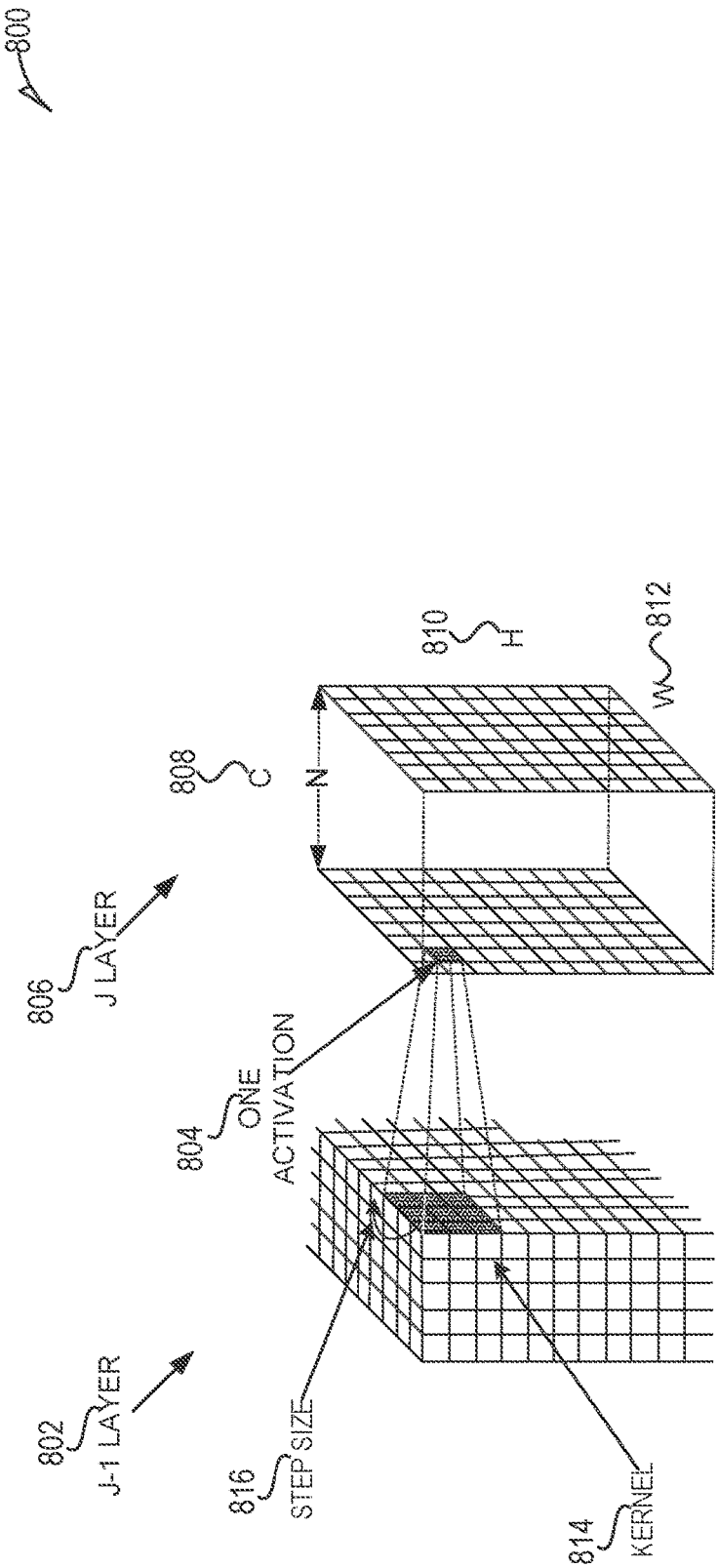
FIG. 8 illustrates an example of determining feature loss, in accordance with some examples.

FIG. 8 illustrates an example of determining feature loss 800, in accordance with some examples. J−1 layer 802 and J layer 806 are convolutional layers of loss network 728. The J layer 806 has channels (C) 808 with a width (W) 812 and height (H) 810. One activation 804, which has a real or integer value, is determined based on Equation (1), in accordance with some examples. Each feature has H 810×W 812 activations. C 808 is comprised of N sublayers. Each feature generates a sublayer of C 808. In some examples a first layer is the input image 614 where the activation is a pixel or pixels of the input image 614. A kernel 814 is the width by height number of activations or pixels that is used to determine the one activation 804 where activations are termed feature values, in accordance with some examples. A feature of a sublayer C 808 is generated by applying the kernel 814 to a layer such as J−1 layer 802. Kernels 814 may be different sizes other than 3×3 as illustrated. The kernel is moved step size 816 through J−1 layer 802. The kernel is three-dimensional such as 3×3×3, in accordance with some examples. The kernel 814 height is less than height (H) of the layer such as J−1 layer 802 and a kernel 814 width is less than a width (W) of the layer such as J−1 layer 802.

Figure 10:
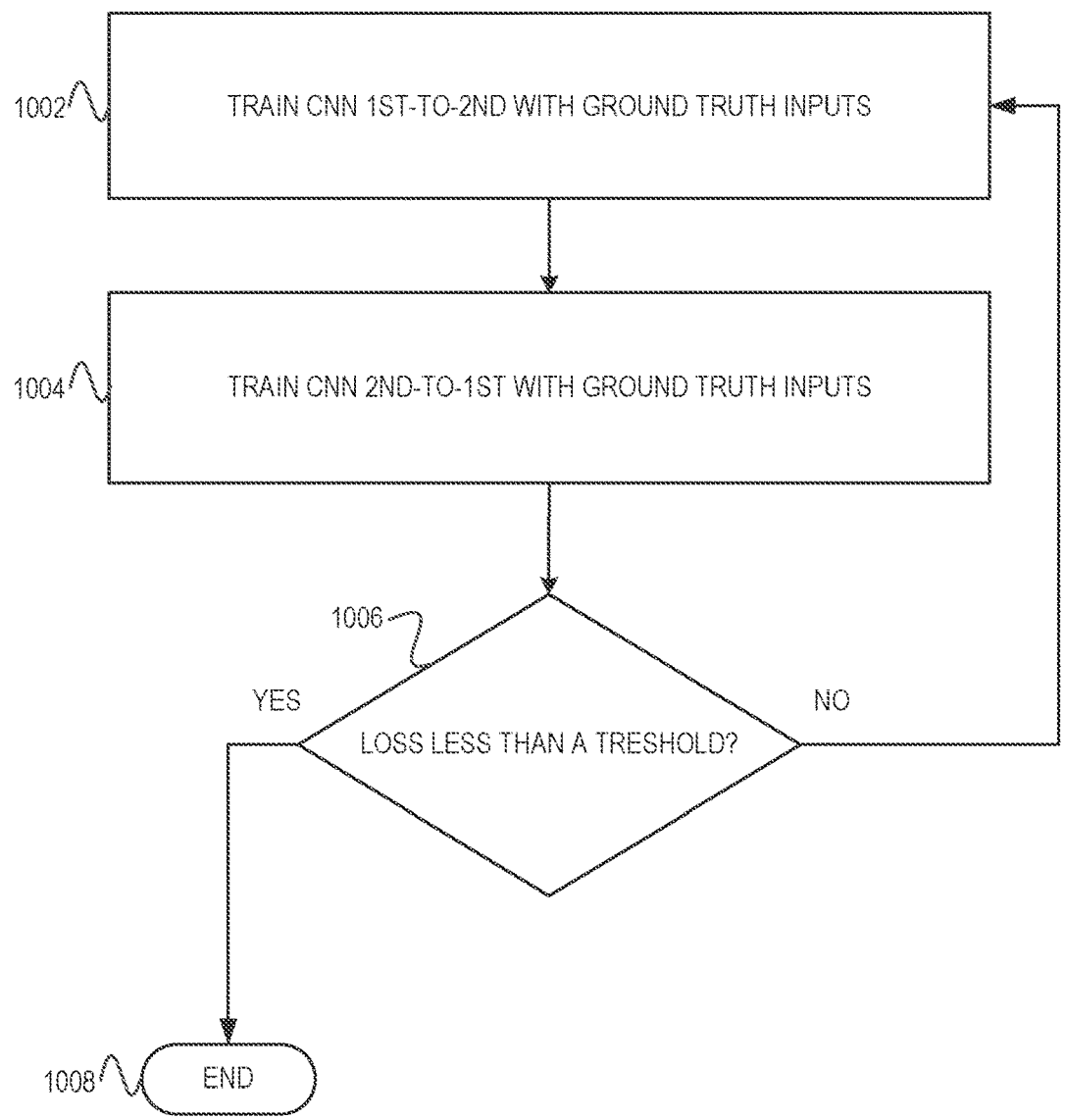
FIG. 10 illustrates a method of training CNNs, in accordance with some examples.

FIGS. 9 and 10 are described in conjunction with one another. FIG. 9 illustrates the training of CNN 1ST-to-2ND 622 and CNN 2ND-to-1ST 732, in accordance with some examples. FIG. 10 illustrates a method 1000 of training CNNs, in accordance with some examples. The ground truth inputs 726, 902 are collections of audio vocals having the first characteristic 730 or second characteristic 906, respectively.

The training module 902 is configured to perform the method 1000, in accordance with some examples. The method 1000 begins at operation 1002 with training the CNN 1ST-to-2ND with ground truth inputs. For example, training module 902 uses audio vocals 728, which may be converted to an image, of ground truth input 726 as the input to CNN 1ST-to-2ND 622, which determines output image 742. Determine loss module 906 determines the logistical loss 736 of feeding output vocals image 744 into CNN 2ND D 738. The output vocals image 744 are then fed into the CNN 2ND-to-1ST 732, which generates output image 718.

Determine loss module 906 determines input-output loss 724 between output vocals image 720 and audio vocals 728 as described in conjunction with FIG. 7. Determine loss module 906 determines total feature loss 706 by feeding audio vocals 728, which may be converted to an image, and output vocals image 720 into the CNN 1ST D 702 as described in conjunction with FIG. 7. The determine loss module 906 determines the logistical loss 736 from the logistical output 735.

The adjust weights module 908 then adjusts the weights 624 based on input-output loss 724, logistical loss 736, and total feature loss 706 as determined by determine loss module 904. Adjust weights module 908 adjusts the weights 624 based on a stochastic gradient descent, in accordance with some examples. The training module 902 trains the CNN 1ST-to-2ND 622 a number of times with a number of ground truth inputs 726. The number of ground truth inputs 726 used may be termed an epoch. The number may be a number such as 1, 10, 100 to 100,000, or another number. The ground truth inputs 726, 902 are audio vocals 728 having first characteristics 706 and second characteristics 722, respectively. As an example, the audio vocals 728, 902 are vocals of a song, and the first characteristic 730 is a male's voice singing the song, and the second characteristic 906 is a female's voice singing the song. In examples the audio vocals 728, 902 are vocals of a male voice and a female voice, respectively.

The method 1000 continues at operation 1004 with training the CNN 2ND-to-1ST with ground truth inputs. For example, training module 902 uses audio vocals 904 of ground truth input 902 as the input to CNN 2ND-to-1ST 732, which determines output image 718. Determine loss module 906 determines the logistical loss 736 of feeding output vocals image 720 into CNN 1ST D 702. The output vocals image 720 are then fed into the CNN 1ST-to-2ND 622, which generates output image 742.

Determine loss module 906 determines input-output loss 724 between output vocals image 744 and audio vocals 904 such as with Equation (6) as described in conjunction with FIG. 7. Determine loss module 906 determines total feature loss 706 by feeding audio vocals 904 and output vocals image 744 into the CNN 2ND D 738 as described in conjunction with FIG. 7.

The adjust weights module 908 then adjusts the weights 734 based on input output loss 724, logistical loss 736, and total feature loss 706 as determined by determine loss module 904. Adjust weights module 908 adjusts the weights 624 based on a stochastic gradient descent, in accordance with some examples. The training module 902 trains the CNN 2ND-to-1ST 732 a number of times with a number of ground truth inputs 902. The number of ground truth inputs 902 used may be termed an epoch. The number may be a number such as 1, 10, 100 to 10,000, or another number.

The method 1000 continues at operation 1006 with determining if a loss is less than a threshold. For example, training module 902 determines a loss based on one or more of input output loss 724, logistical loss 736, and total feature loss 706 based on feeding audio vocals 904 into CNN 2ND-to-1ST 732 and then output vocals image 720 into CNN 1ST-to-2ND 622 and/or based on feeding audio vocals 728 into CNN 1ST-to-2ND 622 and then output vocals image 744 into CNN 2ND-to-1ST 732. The training module 902 then determines whether the loss is less than a threshold.

If the loss is less than a threshold, then the training module 902 determines to end 1008 the method 1000 of training the CNN 1ST-to-2ND 622 and CNN 2ND-to-1ST 732. If the loss is not less than a threshold, then the training module 902 performs operations 1002 and 1004 again. In some examples operation 1006 tests whether a number of the audio vocals 904 fed into CNN 2ND-to-1ST 732 satisfy CNN 1ST D 702 as being vocals with the first characteristic 722 and whether a number of the audio vocals 728 fed into CNN 1ST-to-2ND 622 satisfy CNN 2ND D 738 as being vocals with the second characteristic 746. The training module 902 then determines whether the number of output vocals image 720 and output vocals image 744 that failed the CNN 1ST D 702 or CNN 2ND D 738 is below the threshold. If the number that failed is not less than a threshold, then the training module 902 performs operations 1002 and 1004 again.

One or more of the operations of method 1000 may be optional. Method 1000 may include one or more additional operations. The operations of method 1000 may be performed in a different order.

Figure 11:
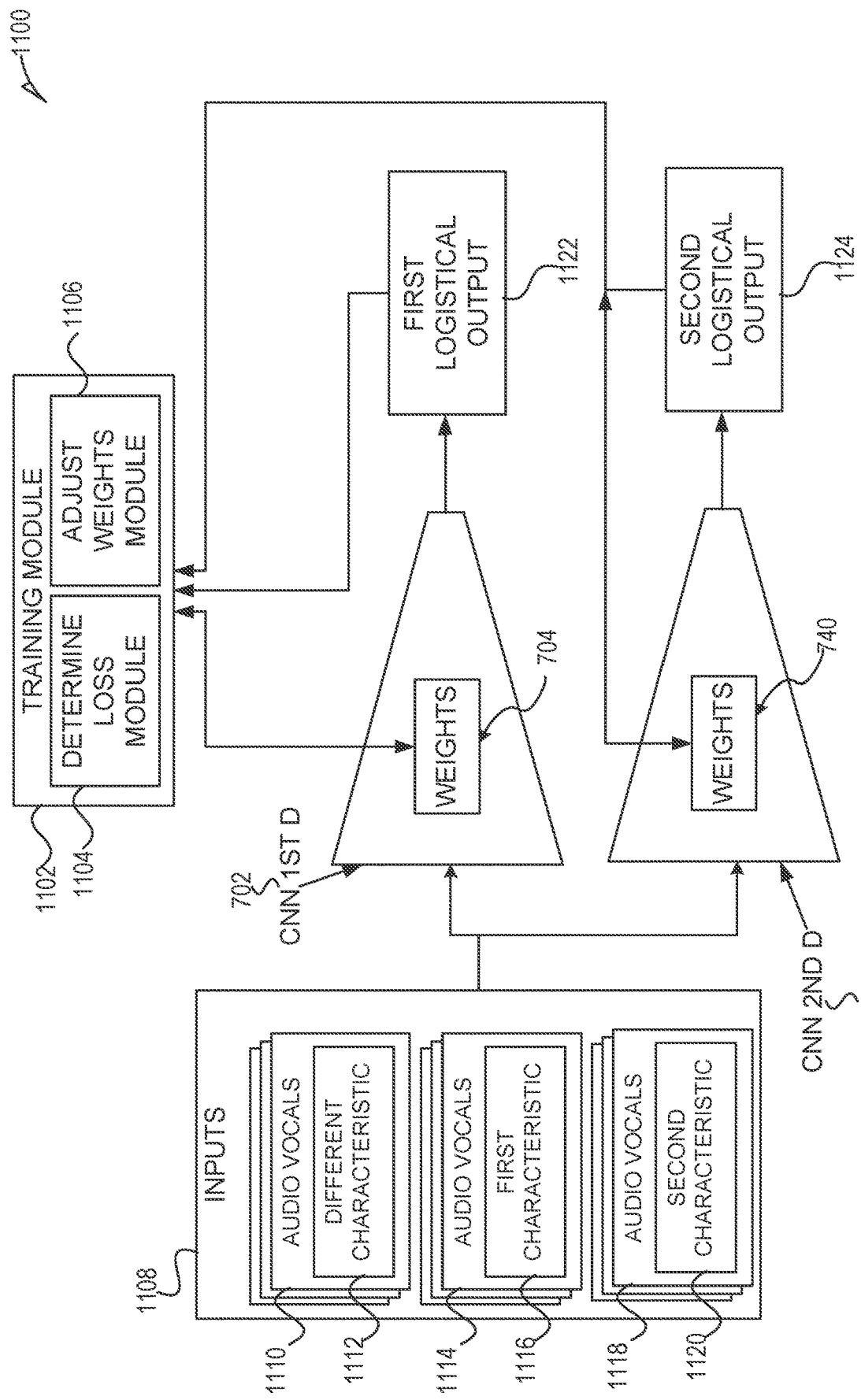
FIG. 11 illustrates training discriminator CNNs, in accordance with some examples.

FIG. 11 illustrates training discriminator CNNs 1100, in accordance with some examples. The training module 1102 is configured to train CNN 1ST D 702 and CNN 2ND D 738. The training module 1102 selects an input 1108 and uses the input 1108 as input to one or both of CNN 1ST D 702 and CNN 2ND D 738. The CNN 1ST D 702 and CNN 2ND D 738 uses weights 704, 740, respectively, to determine the first logistical output 1122 and second logistical output 1124, respectively, as output. The determine loss module 1104 then determines whether the CNN 1ST D 702 and CNN 2ND D 738 properly discriminated the ground truth input 1108 to determine a first logistical loss and second logistical loss, respectively. For example CNN 1ST D 702 should generate a first logistical value 1122 that indicates yes for all audio vocals 1114 having the first characteristic 1116 and a value that indicates no for all the other ground truth input 1108. Additionally CNN 2ND D 738 should generate a second logistical value 1124 that indicates yes for all audio vocals 1118 having the second characteristic 1120 and a value that indicates no for all the other ground truth input 1108. Determine loss module 1104 determines a loss for when first logistical output 1122 is correct and when first logistical output 1122 is wrong. And, similarly, determine loss module 1104 determines a loss for when second logistical output 1124 is correct and when second logistical output 1124 is wrong.

Adjust weights module 1106 adjusts the weights 704, 740 based on a stochastic gradient descent, in accordance with some examples. In some examples, the CNN 1ST D 702 and CNN 2ND D 738 do not include maximum pooling layers. In some examples, the CNN 1ST D 702 and CNN 2ND D 738 comprise convolution layers that use ReLU for an activation function with a n×n stride with n being 3 or another integer such as 2, 4, 5, and so forth. In some examples, the CNN 1ST D 702 and CNN 2ND D 738 comprise multiple convolution layers, a down-conversion layer, and a fully connected layer.

The training module 1102 may repeat the process of selecting inputs 1108 a number of times, n, to train the CNN 1ST D 702 and CNN 2ND D 738. The number of times may be a number such as 1000 to 100,000, or another number. CNN 1ST D 702 and CNN 2ND D 738 are trained separately in some examples.

Figure 12:
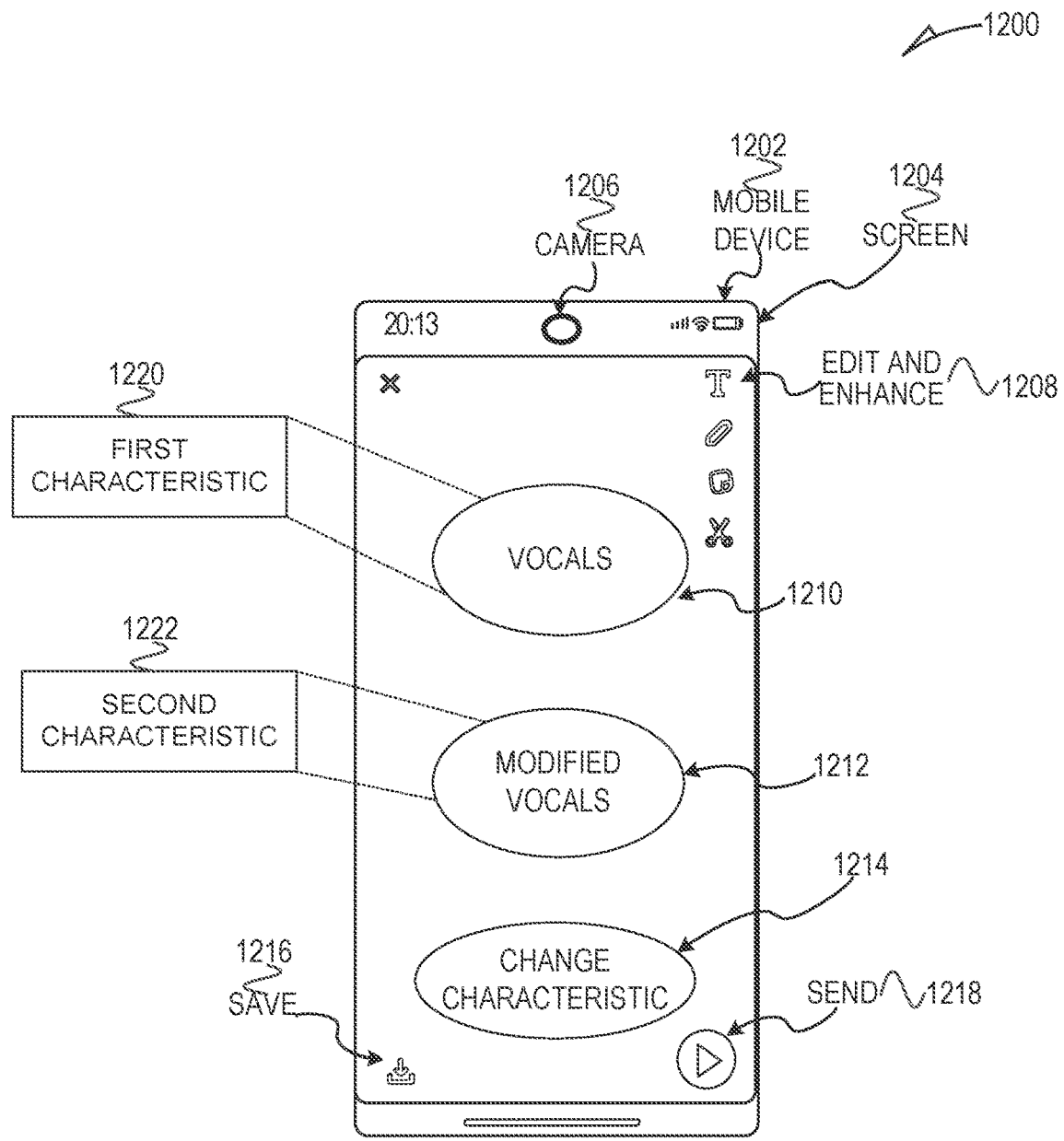
FIG. 12 illustrates a user interface for changing characteristics of vocals, in accordance with some examples.

FIG. 12 illustrates a user interface 1200 for changing characteristics of vocals, in accordance with some examples. Illustrated in FIG. 12 is a mobile device 1202 with a screen 1204 and a camera 1206. The mobile device 1202 is a client device 102, in accordance with some examples. The screen 1204 is a touch screen, in accordance with some examples. Displayed on the screen are vocals 1210 having a first characteristic 1220. The vocals 1210 is a visual representation of vocals such as an icon, a name, duration, or a frequency-time graph. A user of the user interface 1200 invokes a user interface item such as change characteristic 1214 that causes the vocals 1210 to be processed by a CNN such as CNN 622 with weights 624 of FIG. 6. The modified vocals 1212 having the second characteristic 1222 are generated. For example, referring to FIGS. 6 and 12, the vocals 1210 having the first characteristic 1220 may be the audio vocals 604 having the first characteristic 606, and the modified vocals 1212 having the second characteristic 1222 may be the generated vocals 638 having the second characteristic 640.

The user may save 1216 the modified audio vocals 1212 to a local or networked storage. The user may send 1218 the modified audio vocals 1212 or a link to the modified audio vocals 1212 in a message such as an ephemeral message. In some examples, the user may edit and enhance 1208 the modified vocals 1212 such as editing the length of the audio vocals, deleting portions of the audio vocals, or adding graphics or text lyrics to the audio vocals to be displayed in conjunction with playing the modified vocals 1212. In some examples change characteristics 1214 will switch the audio vocals from the first characteristic to the second characteristic in real-time. For example, the user may be using the mobile device 1200 for a telephone call. The selection of change characteristic 1214 changes the character of the audio vocals the user is speaking from having the first characteristic to having the second characteristic. In some examples switch characteristic 1214 may be associated with an application run on the mobile device 1202 such as an application to create a video or image with associated audio vocals. The user may be able to either switch the characteristics of the audio vocals in real-time or modify the characteristic of the audio vocals after recording the audio vocals. In some examples the user may be able to select the second characteristic from a library of second characteristics. In some examples the changing characteristics of vocals system 214 of FIG. 2 will determine the first characteristic 1220 and select a CNN trained to change the vocals having the first characteristic 1220 to vocals having the second characteristic 1222. In some examples the changing characteristics of vocals system 214 of FIG. 2 will determine the first characteristic 1220 of vocals 1210 and offer a list of second characteristics 1222 from which the user may select.

Figure 13:
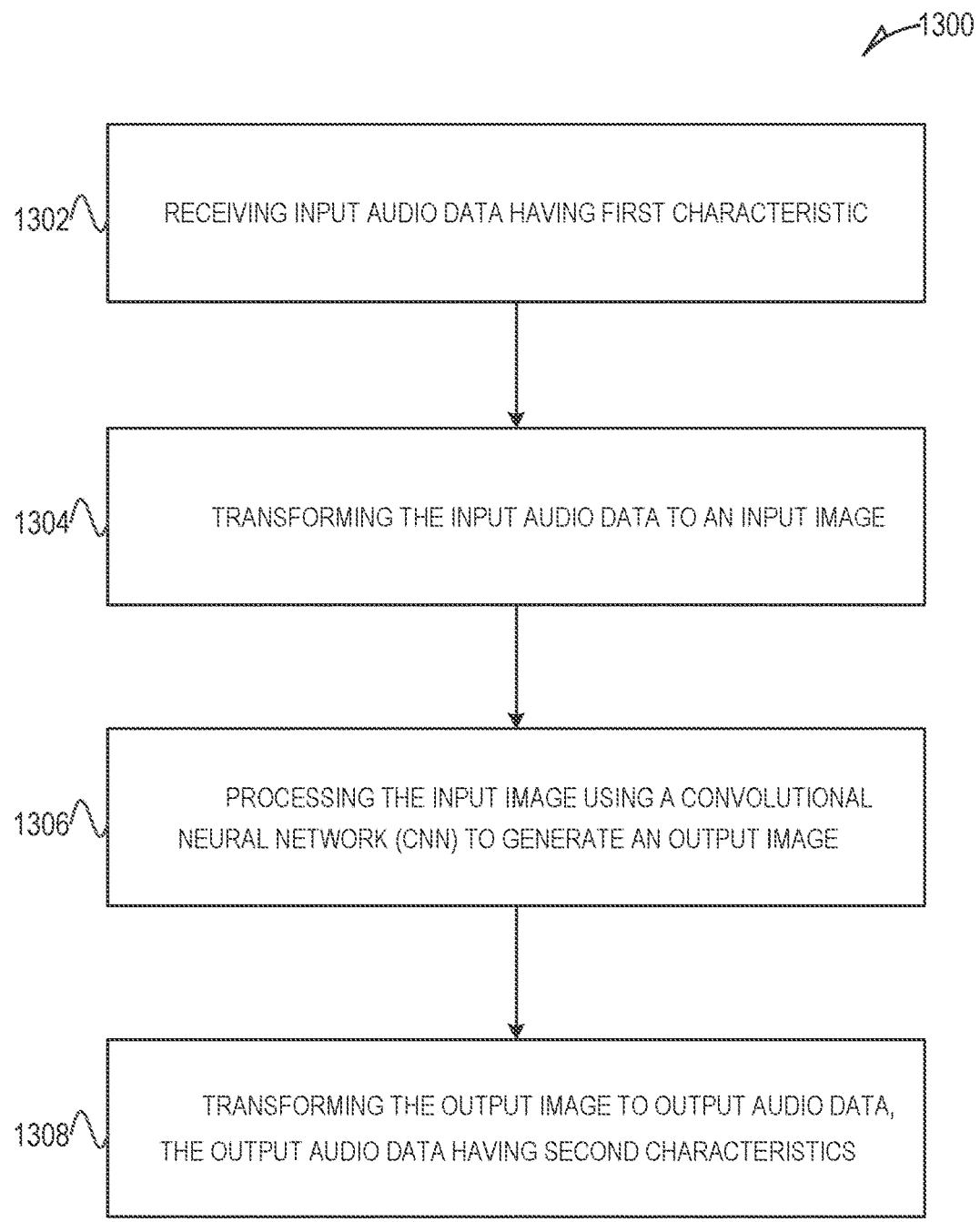
FIG. 13 illustrates a method of changing characteristics of vocals, in accordance with some examples.

FIG. 13 illustrates a method 1300 of changing characteristics of vocals, in accordance with some examples. The method 1300 begins at operation 1302 with receiving input audio data having first characteristics. For example, referring to FIG. 6, the audio mixture 602 includes audio vocals 604 having first characteristic 606.

The method 1300 continues at operation 1304 with transforming the input audio data to an input image, the input image representing the frequencies and intensities of the audio. For example, referring to FIG. 6, the audio vocals 604 are transformed and isolated 612 into the input image 614. The audio vocals 604 is first isolated from the additional audio 610 and then converted into an input image 614 as described in conjunction with FIG. 6 and herein.

The method 1300 continues at operation 1306 with processing the input image using a CNN to generate an output image. For example, referring to FIG. 6, input image 614 is processed by CNN 1ST-TO-2ND 622 to generate output image 626. In another example, referring to FIG. 7, audio vocals 728 is processed by CNN 1ST-TO-2ND 622 to generate output image 742.

The method 1300 continues at operation 1308 with transforming the output image to output audio data, the output audio data having second characteristics. For example, referring to FIG. 6, output image 626 is transformed and merged 634 to generated vocals 638 having the second characteristic 640.

One or more of the operations of method 1300 may be optional. Method 1300 may include one or more additional operations. The operations of method 1300 may be performed in a different order.

Machine Architecture

Figure 14:
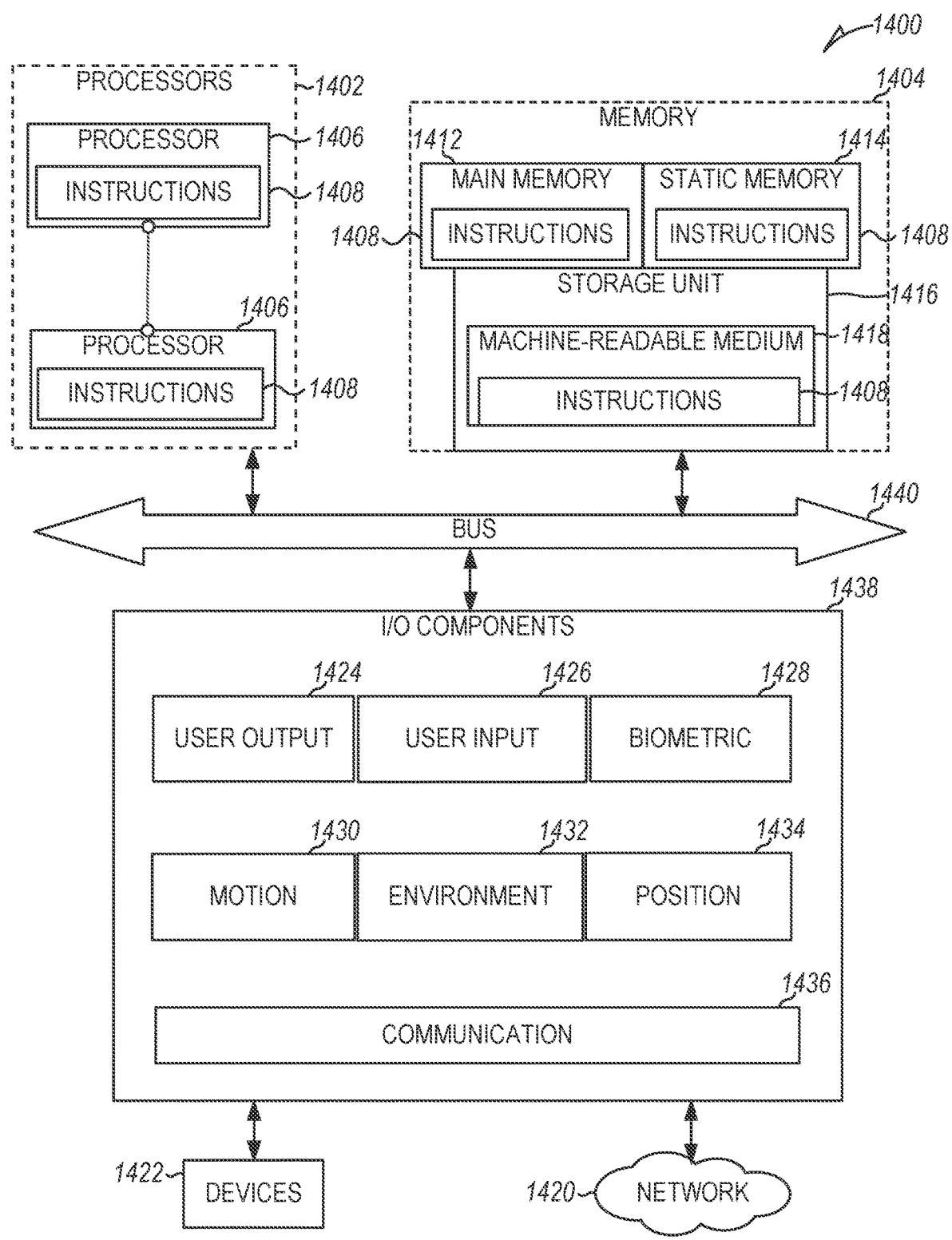
FIG. 14 is a diagrammatic representation of a machine in the form of a computer system within which a set of instructions may be executed for causing the machine to perform any one or more of the methodologies discussed herein, in accordance with some examples.

FIG. 14 is a diagrammatic representation of the machine 1400 within which instructions 1408 (e.g., software, a program, an application, an applet, an app, or other executable code) for causing the machine 1400 to perform any one or more of the methodologies discussed herein may be executed. For example, the instructions 1408 may cause the machine 1400 to execute any one or more of the methods described herein. The instructions 1408 transform the general, non-programmed machine 1400 into a particular machine 1400 programmed to carry out the described and illustrated functions in the manner described. The machine 1400 may operate as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1408, sequentially or otherwise, that specify actions to be taken by the machine 1400. Further, while only a single machine 1400 is illustrated, the term "machine" shall also be taken to include a collection of machines that individually or jointly execute the instructions 1408 to perform any one or more of the methodologies discussed herein. The machine 1400, for example, may comprise the client device 102 or any one of a number of server devices forming part of the messaging server system 108. In some examples, the machine 1400 may also comprise both client and server systems, with certain operations of a particular method or algorithm being performed on the server-side and with certain operations of the particular method or algorithm being performed on the client-side.

The machine 1400 may include processors 1402, memory 1404, and input/output I/O components 1438, which may be configured to communicate with each other via a bus 1440. The processors 1402 may be termed computer processors, in accordance with some examples. In an example, the processors 1402 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1406 and a processor 1402 that execute the instructions 1408. The term "processor" is intended to include multi-core processors that may comprise two or more independent processors (sometimes referred to as "cores") that may execute instructions contemporaneously. Although FIG. 14 shows multiple processors 1402, the machine 1400 may include a single processor with a single-core, a single processor with multiple cores (e.g., a multi-core processor), multiple processors with a single core, multiple processors with multiples cores, or any combination thereof.

The memory 1404 includes a main memory 1412, a static memory 1414, and a storage unit 1416, both accessible to the processors 1402 via the bus 1440. The main memory 1404, the static memory 1414, and storage unit 1416 store the instructions 1408 embodying any one or more of the methodologies or functions described herein. The instructions 1408 may also reside, completely or partially, within the main memory 1412, within the static memory 1414, within machine-readable medium 1418 within the storage unit 1416, within at least one of the processors 1402 (e.g., within the Processor's cache memory), or any suitable combination thereof, during execution thereof by the machine 1400.

The I/O components 1438 may include a wide variety of components to receive input, provide output, produce output, transmit information, exchange information, capture measurements, and so on. The specific I/O components 1438 that are included in a particular machine will depend on the type of machine. For example, portable machines such as mobile phones may include a touch input device or other such input mechanisms, while a headless server machine will likely not include such a touch input device. It will be appreciated that the I/O components 1438 may include many other components that are not shown in FIG. 14. In various examples, the I/O components 1438 may include user output components 1424 and user input components 1426. The user output components 1424 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1426 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1438 may include biometric components 1428, motion components 1430, environmental components 1432, or position components 1434, among a wide array of other components. For example, the biometric components 1428 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1430 include acceleration sensor components (e.g., accelerometer), gravitation sensor components, rotation sensor components (e.g., gyroscope).

The environmental components 1432 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detect ion sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1434 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1438 further include communication components 1436 operable to couple the machine 1400 to a network 1420 or devices 1422 via respective coupling or connections. For example, the communication components 1436 may include a network interface Component or another suitable device to interface with the network 1420. In further examples, the communication components 1436 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1422 may be another machine or any of a wide variety of peripheral devices (e.g., a peripheral device coupled via a USB).

Moreover, the communication components 1436 may detect identifiers or include components operable to detect identifiers. For example, the communication components 1436 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1436, such as location via Internet Protocol (IP) geolocation, location via Wi-Fi® signal triangulation, location via detecting an NFC beacon signal that may indicate a particular location, and so forth.

The various memories (e.g., main memory 1412, static memory 1414, and memory of the processors 1402) and storage unit 1416 may store one or more sets of instructions and data structures (e.g., software) embodying or used by any one or more of the methodologies or functions described herein. These instructions (e.g., the instructions 1408), when executed by processors 1402, cause various operations to implement the disclosed examples.

The instructions 1408 may be transmitted or received over the network 1420, using a transmission medium, via a network interface device (e.g., a network interface component included in the communication components 1436) and using any one of several well-known transfer protocols (e.g., hypertext transfer protocol (HTTP)). Similarly, the instructions 1408 may be transmitted or received using a transmission medium via a coupling (e.g., a peer-to-peer coupling) to the devices 1422.

Software Architecture

Figure 15:
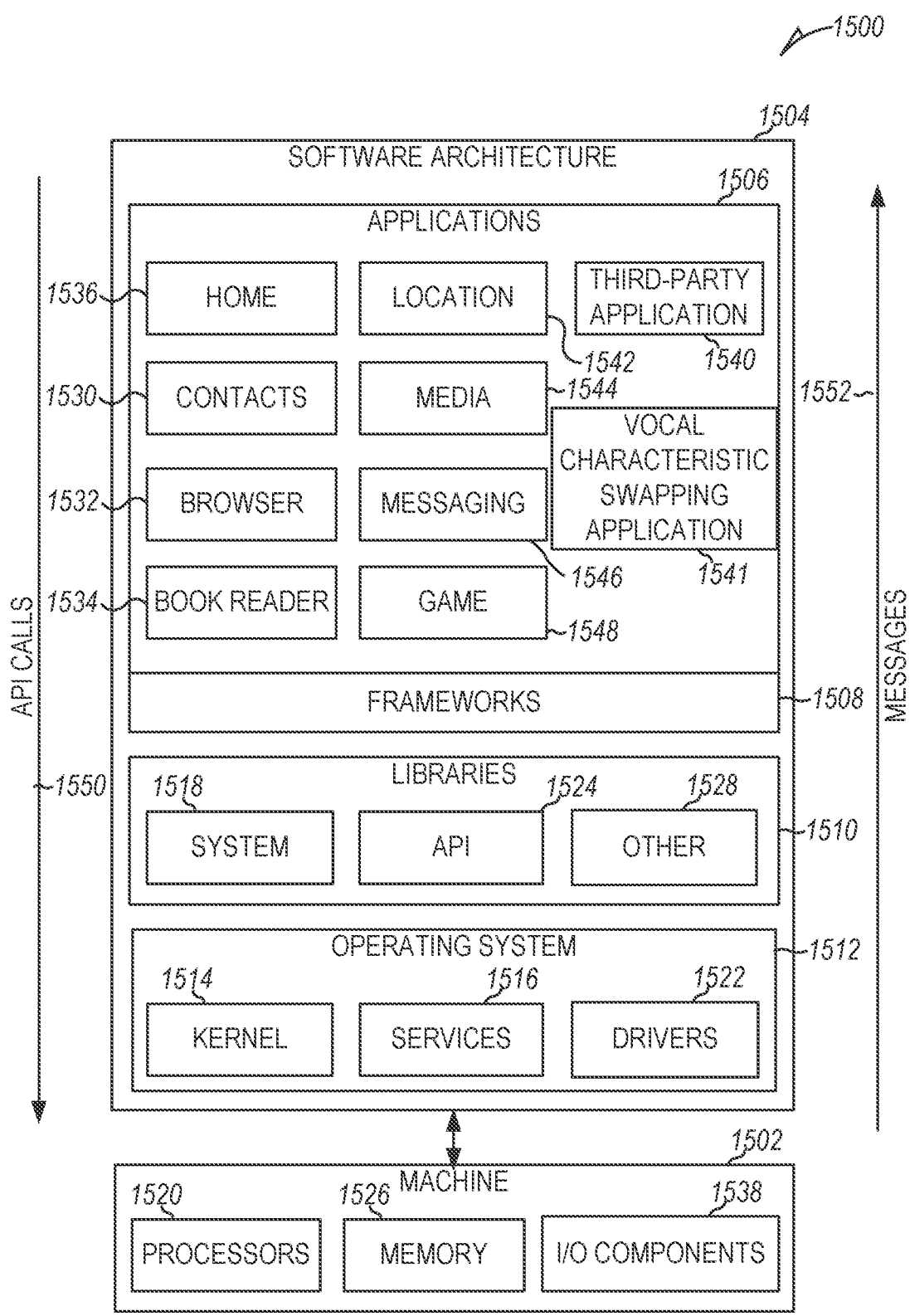
FIG. 15 is a block diagram showing a software architecture within which examples may be implemented.

FIG. 15 is a block diagram 1500 illustrating a software architecture 1504, which can be installed on any one or more of the devices described herein. The software architecture 1504 is supported by hardware such as a machine 1502 that includes processors 1520, memory 1526, and I/O components 1538. In this example, the software architecture 1504 can be conceptualized as a stack of layers, where each layer provides a particular functionality. The software architecture 1504 includes layers such as an operating system 1512, libraries 1510, frameworks 1508, and applications 1506. Operationally, the applications 1506 invoke API calls 1550 through the software stack and receive messages 1552 in response to the API calls 1550.

The operating system 1512 manages hardware resources and provides common services. The operating system 1512 includes, for example, a kernel 1514, services 1516, and drivers 1522. The kernel 1514 acts as an abstraction layer between the hardware and the other software layers. For example, the kernel 1514 provides memory management, processor management (e.g., scheduling), component management, networking, and security settings, among other functionality. The services 1516 can provide other common services for the other software layers. The drivers 1522 are responsible for controlling or interfacing with the underlying hardware. For instance, the drivers 1522 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1510 provide a common low-level infrastructure used by the applications 1506. The libraries 1510 can include system libraries 1518 (e.g., C standard library) that provide functions such as memory allocation functions, string manipulation functions, mathematic functions, and the like. In addition, the libraries 1510 can include API libraries 1524 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1510 can also include a wide variety of other libraries 1528 to provide many other APIs to the applications 1506.

The frameworks 1508 provide a common high-level infrastructure that is used by the applications 1506. For example, the frameworks 1508 provide various graphical user interface (GUI) functions, high-level resource management, and high-level location services. The frameworks 1508 can provide a broad spectrum of other APIs that can be used by the applications 1506, some of which may be specific to a particular operating system or platform.

In an example, the applications 1506 may include a home application 1536, a contacts application 1530, a browser application 1532, a book reader application 1534, a vocal characteristic swapping application 1541, a location application 1542, a media application 1544, a messaging application 1546, a game application 1548, and a broad assortment of other applications such as a third-party application 1540. The vocal characteristic swapping application 1541 is configured to perform the operations as disclosed in conjunction with FIGS. 6-13 and herein, in accordance with some examples. The applications 1506 are programs that execute functions defined in the programs. Various programming languages can be employed to create one or more of the applications 1506, structured in a variety of manners, such as object-oriented programming languages (e.g., Objective-C, Java, or C++) or procedural programming languages (e.g., C or assembly language). In a specific example, the third-party application 1540 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1540 can invoke the API calls 1550 provided by the operating system 1512 to facilitate functionality described herein.

Processing Components

Figure 16:
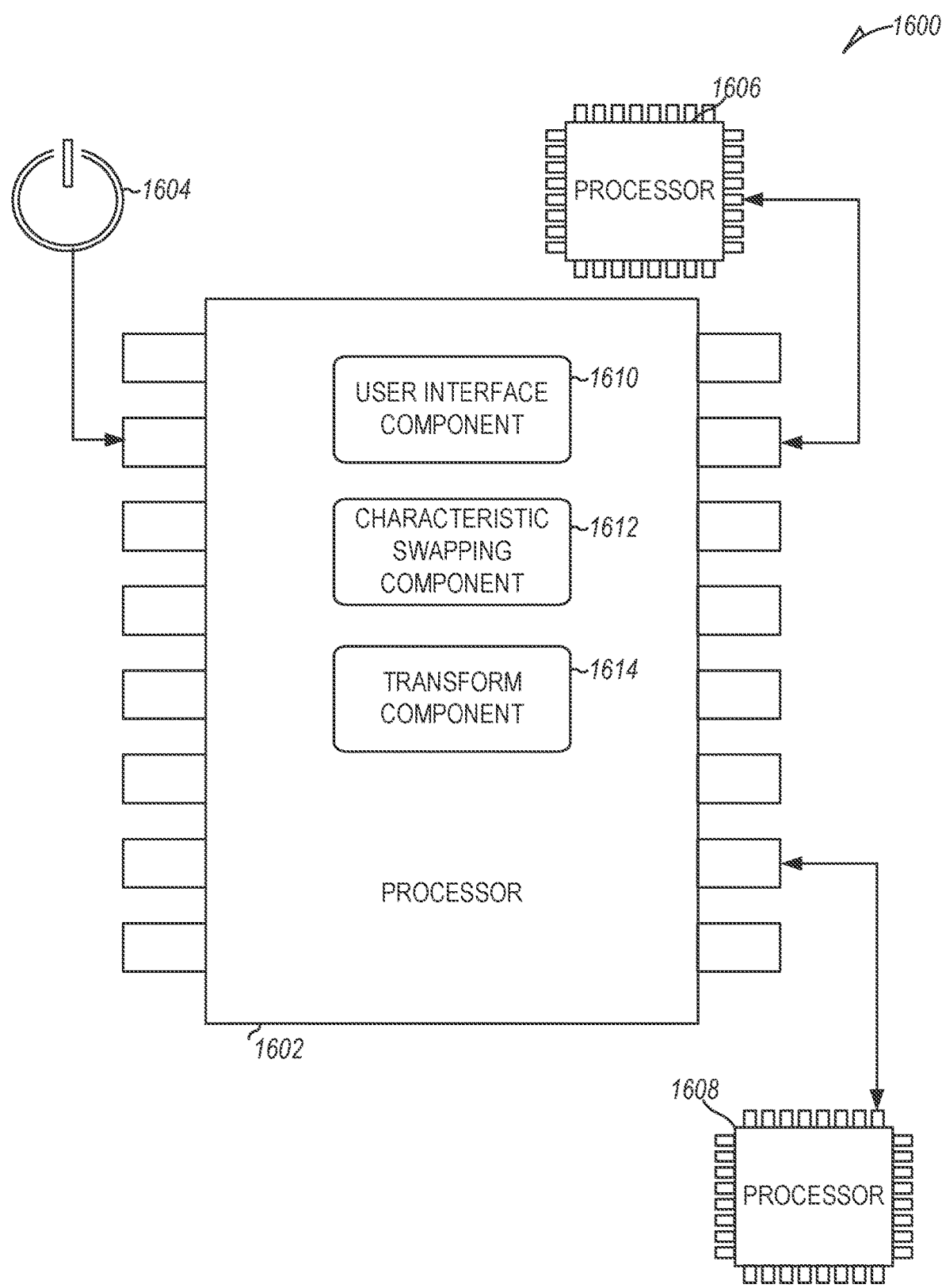
FIG. 16 is a diagrammatic representation of a processing environment, in accordance with some examples.

Turning now to FIG. 16, there is shown a diagrammatic representation of a processing environment 1600, which includes a processor 1602, processor 1606, and a processor 1608 (e.g., a GPU, CPU or combination thereof). The processor 1602 is shown to be coupled to a power source 1604, and to include (either permanently configured or temporarily instantiated) modules, namely a user interface component 1610, a character swapping component 1612, and a transform component 1614. Referring to FIGS. 12 and 16, the user interface component 1610 operationally presents a user interface such as is illustrated in FIG. 12 and responds to user selections such as change characteristic 1214 to change a characteristic of the vocals 1210 and causes the modified vocals 1212 to be presented or stored; referring to FIGS. 6 and 12, the characteristic swapping component 1612 takes an input image 614 and processes the input image 614 to generate the output image 626 and performs one or more of the operations of method 1300; and, the transform component 1614 operationally performs the operations of transform and isolate 612, 634 of FIG. 6. As illustrated, the processor 1602 is communicatively coupled to both the processor 1606 and the processor 1608.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1402 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example examples, the processors or processor-implemented components may be located in a single geographic location (e.g., within a home environment, an office environment, or a server farm). In other example examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure. The plural of "computer-readable medium" may be termed "computer-readable mediums".

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
receiving input vocal data, the input vocal data representing input vocals having a first characteristic;
transforming the input vocal data to an input image, the input image representing frequencies and intensities of the input vocals, wherein the input image has a plurality of pixels with a pixel height and a pixel width, and wherein a first axis is a time, a second axis is a frequency, and an amplitude is represented by an intensity of a pixel of the plurality of pixels;
processing the input image using a first convolutional neural network (CNN) to generate a first output image;
processing the first output image, using a second CNN, to generate a second output image;
determining a loss between the input image and the second output image;
training the first CNN based on the determined loss;
processing, using a third CNN, the second output image to generate a first logistical output;
storing first feature values determined in processing the second output image by the third CNN;
processing, using the third CNN, the input image to generate a second logistical output;
storing second feature values determined in processing the input image by the third CNN;
determining a feature loss based on differences between the second feature values and the first feature values; and
training the first CNN further based on the feature loss, the first logistical output and the second logistical output.

2. The method of claim 1, further comprising:
training the second CNN based on the determined loss.

3. The method of claim 1, further comprising:
transforming the second output image to output vocal data representing output vocals, the output vocals having a second characteristic.

4. The method of claim 1 wherein the training the first CNN further based on the feature loss further comprises:
training the first CNN using stochastic gradient descent to minimize a weighted combination of the feature loss, the determined loss, and a logistical loss.

5. The method of claim 4, wherein processing, using the third CNN, the input image further comprises:
determining a first layer of the first feature values by convolving a plurality of kernels with the input image to determine feature values for the first layer, wherein the plurality of kernels have kernel pixel heights less than the pixel height of the input image and kernel pixel widths less than the pixel width of the input image, and wherein each kernel of the plurality of kernels generates a sublayer of the first layer.

6. The method of claim 1 wherein the first characteristic is a male vocalization and the first CNN is trained to generate the first output image to have a second characteristic, wherein the second characteristic is a female vocalization.

7. The method of claim 1 wherein the method further comprises:
processing, using a fourth CNN, the second output image to generate a logistical output, the logistical output indicating whether the second output image comprises output vocals having the first characteristic; and
training the first CNN further based on the logistical output.

8. The method of claim 7, wherein the fourth CNN comprises multiple convolution layers, a down-conversion layer, and a fully connected layer.

9. The method of claim 7, wherein the fourth CNN is trained to determine whether the second output image comprises output vocals having the first characteristic.

10. The method of claim 1, wherein the input vocal data is first input vocal data, and wherein the first CNN and the second CNN are trained together based on the first input vocal data having the first characteristic and second input vocal data having a second characteristic, and wherein a first producer of the first input vocal data and a second producer of the second input vocal data differ in a characteristic.

11. The method of claim 10, wherein the characteristic is a gender.

12. The method of claim 10, wherein the characteristic is genuine or synthetic, and wherein the first characteristic indicates a voice of a genuine human and the second characteristic indicates a voice of a synthetic character.

13. The method of claim 10, wherein the first characteristic is a first pattern of frequencies and intensities and the second characteristic is a second pattern of frequencies and intensities or wherein the first characteristic and the second characteristic indicate different frequency ranges of the input vocals.

14. The method of claim 1, wherein the first CNN comprises multiple convolution layers, a maximum pooling layer, an up-conversion layer, and a fully connected layer.

15. A system comprising:
one or more computer processors; and
one or more computer-readable mediums storing instructions that, when executed by the one or more computer processors, cause the system to perform operations comprising:
receiving input vocal data, the input vocal data representing input vocals having a first characteristic;
transforming the input vocal data to an input image, the input image representing frequencies and intensities of the input vocals, wherein the input image has a plurality of pixels with a pixel height and a pixel width, and wherein a first axis is a time, a second axis is a frequency, and an amplitude is represented by an intensity of a pixel of the plurality of pixels;
processing the input image using a first convolutional neural network (CNN) to generate a first output image;
processing the first output image, using a second CNN, to generate a second output image;
determining a loss between the input image and the second output image;
training the first CNN based on the determined loss;
processing, using a third CNN, the second output image to generate a first logistical output;
storing first feature values determined in processing the second output image by the third CNN;
processing, using the third CNN, the input image to generate a second logistical output;

storing second feature values determined in processing the input image by the third CNN;

determining a feature loss based on differences between the second feature values and the first feature values; and training the first CNN further based on the feature loss, the first logistical output and the second logistical output.

16. The system of claim 15, wherein the operations further comprise:

training the second CNN based on the determined loss.

17. A non-transitory computer-readable storage medium including instructions that, when processed by a computer, configure the computer to perform operations comprising:

receiving input vocal data, the input vocal data representing input vocals having a first characteristic;

transforming the input vocal data to an input image, the input image representing frequencies and intensities of the input vocals, wherein the input image has a plurality of pixels with a pixel height and a pixel width, and wherein a first axis is a time, a second axis is a frequency, and an amplitude is represented by an intensity of a pixel of the plurality of pixels;

processing the input image using a first convolutional neural network (CNN) to generate a first output image;

processing the first output image, using a second CNN, to generate a second output image;

determining a loss between the input image and the second output image;

training the first CNN based on the determined loss;

processing, using a third CNN, the second output image to generate a first logistical output;

storing first feature values determined in processing the second output image by the third CNN;

processing, using the third CNN, the input image to generate a second logistical output;

storing second feature values determined in processing the input image by the third CNN;

determining a feature loss based on differences between the second feature values and the first feature values; and training the first CNN further based on the feature loss, the first logistical output and the second logistical output.

18. The non-transitory computer-readable storage medium of claim 17 wherein the operations further comprise:

training the second CNN based on the determined loss.

19. The non-transitory computer-readable storage medium of claim 17, further comprising:

transforming the second output image to output vocal data representing output vocals, the output vocals having a second characteristic.

20. The non-transitory computer-readable storage medium of claim 17, wherein the training the first CNN further based on the feature loss further comprises:

training the first CNN using stochastic gradient descent to minimize a weighted combination of the feature loss, the determined loss, and a logistical loss.

* * * * *